(12) United States Patent
Kim et al.

(10) Patent No.: US 11,233,619 B2
(45) Date of Patent: *Jan. 25, 2022

(54) METHOD AND APPARATUS FOR MEASURING SERVING AND NEIGHBORING CELLS

(71) Applicant: Samsung Electronics Co., Ltd., Gyeonggi-do (KR)

(72) Inventors: Soeng-Hun Kim, Gyeonggi-do (KR); Gert-Jan Van Lieshout, Middlesex (GB); Kyeong-In Jeong, Gyeonggi-do (KR)

(73) Assignee: Samsung Electronics Co., Ltd

( * ) Notice: Subject to any disclaimer, the term of this patent is extended or adjusted under 35 U.S.C. 154(b) by 138 days.

This patent is subject to a terminal disclaimer.

(21) Appl. No.: 16/659,166

(22) Filed: Oct. 21, 2019

(65) Prior Publication Data

US 2020/0059343 A1 Feb. 20, 2020

Related U.S. Application Data

(63) Continuation of application No. 16/049,176, filed on Jul. 30, 2018, now Pat. No. 10,454,649, which is a (Continued)

(30) Foreign Application Priority Data

Jan. 29, 2014 (KR) .................. 10-2014-0011761
May 9, 2014 (KR) .................. 10-2014-0055604

(51) Int. Cl.
*H04L 5/00* (2006.01)
*H04W 24/10* (2009.01)
(Continued)

(52) U.S. Cl.
CPC ............ *H04L 5/0053* (2013.01); *H04L 5/001* (2013.01); *H04L 5/0098* (2013.01); *H04W 24/10* (2013.01);
(Continued)

(58) Field of Classification Search
CPC ..... H04L 5/0053; H04L 5/001; H04L 5/0098; H04L 5/0057; H04L 5/0091; H04L 43/06;
(Continued)

(56) References Cited

U.S. PATENT DOCUMENTS 8,670,366 B2  3/2014 Gou
9,756,678 B2  9/2017 Yamada
(Continued)

FOREIGN PATENT DOCUMENTS

CN       101682852    3/2010
CN       102017702    4/2011
(Continued)

OTHER PUBLICATIONS

Jelne Damnjanovic, "Techniques for Using Carrier Aggregation In Dual Connectivity Wireless Communications", Nov. 1, 2013 (Year: 2013).*

(Continued)

*Primary Examiner* — Ian N Moore
*Assistant Examiner* — Latresa A McCallum
(74) *Attorney, Agent, or Firm* — The Farrell Law Firm, P.C.

(57) ABSTRACT

The present disclosure relates to a pre-5$^{th}$-Generation (5G) or 5G communication system to be provided for supporting higher data rates Beyond 4$^{th}$-Generation (4G) communication system such as long term evolution (LTE). A method for performing a measurement procedure by a user equipment (UE) in a wireless communication system supporting a dual connectivity (DC) is provided. The method includes receiv-
(Continued)

ing control information including measurement gap configuration information indicating gap configuration for at least one operating frequency band to which a measurement gap is applied; obtaining a system frame number (SFN) of a serving cell and a sub-frame of the serving cell based on the measurement gap configuration information; determining a first sub-frame of the measurement gap based on the SFN and the sub-frame; and performing a measurement on at least one serving cell including the serving cell at the first sub-frame.

24 Claims, 20 Drawing Sheets

Related U.S. Application Data continuation of application No. 14/771,736, filed as application No. PCT/KR2015/000844 on Jan. 27, 2015, now Pat. No. 10,038,538.

(51) Int. Cl.
*H04W 36/04* (2009.01)
*H04W 72/04* (2009.01)
*H04B 7/022* (2017.01)

(52) U.S. Cl.
CPC ....... *H04W 36/04* (2013.01); *H04W 72/0453* (2013.01); *H04B 7/022* (2013.01); *H04L 5/0057* (2013.01); *H04L 5/0091* (2013.01)

(58) Field of Classification Search
CPC . H04W 24/10; H04W 36/04; H04W 72/0453; H04W 8/005; H04W 24/02; H04W 36/00; H04W 36/0083; H04W 36/0088; H04W 40/24; H04W 52/365; H04W 72/08; H04W 36/125; H04W 36/026; H04B 7/022; H04B 7/04
See application file for complete search history.

(56) References Cited

U.S. PATENT DOCUMENTS

| | | |
|---|---|---|
| 2006/0223557 A1 | 10/2006 | Manohar |
| 2008/0189970 A1 | 8/2008 | Wang et al. |
| 2009/0270103 A1 | 10/2009 | Pani et al. |
| 2011/0080962 A1 | 4/2011 | Blankenship |
| 2011/0317577 A1 | 12/2011 | Yamada |
| 2012/0178465 A1 | 7/2012 | Lin |
| 2013/0235755 A1 | 9/2013 | Lucky et al. |
| 2013/0242796 A1 | 9/2013 | Chen et al. |
| 2013/0267246 A1* | 10/2013 | Wang .................... H04W 24/10 455/456.1 |
| 2013/0308481 A1 | 11/2013 | Kazmi et al. |
| 2013/0315114 A1 | 11/2013 | Seo et al. |
| 2014/0010189 A1 | 1/2014 | Tian |
| 2014/0146907 A1* | 5/2014 | Kim ...................... H04B 7/0486 375/267 |
| 2015/0018010 A1 | 1/2015 | Fischer |
| 2015/0327322 A1 | 11/2015 | Huang |
| 2019/0132862 A1* | 5/2019 | Jeon ...................... H04L 5/0064 |

FOREIGN PATENT DOCUMENTS

| | | |
|---|---|---|
| CN | 102595450 | 7/2012 |
| CN | 102714816 | 10/2012 |
| CN | 103299670 | 9/2013 |
| CN | 103314613 | 9/2013 |
| CN | 103404047 | 11/2013 |
| EP | 2 373 079 | 10/2011 |
| EP | 2 928 251 | 10/2015 |
| WO | WO 2012/094983 | 7/2012 |

OTHER PUBLICATIONS

Samsung, "Discussion on UE Measurement Gap for Dual Connectivity", R2-143121, 3GPP TSG-RAN WG2 Meeting #87, Aug. 18-22, 2014, 6 pages.
Samsung, "Discussion on Per-UE Measurement Gap for DC", R2-142242, 3GPP TSG-RAN WG2 Meeting #86, May 19-23, 2014, 6 pages.
European Search Report dated Jun. 15, 2020 issued in counterpart application No. 20160683.7-1205, 12 pages.
Samsung, "SFN Handling for Small Cells", R2-134015, 3GPP TSG RAN WG2 #84, Nov. 11-15, 2013, 2 pages.
Etri, "Provisioning of the SeNB System Information", R2-133887, 3GPP TSG-RAN WG2#84, Nov. 11-15, 2013, 3 pages.
HTC, "Discussion on UE Configuration in Small Cell Enhancement", R2-134065, 3GPP TSG-RAN2 Meeting #84, Nov. 4-8, 2013, 2 pages.
European Search Report dated Sep. 22, 2016 issued in counterpart application No. 15743200.6-1851, 10 pages.
Chinese Office Action dated Jan. 31, 2018 issued in counterpart application No. 201580000398.1, 16 pages.
Huawei "Time Alignment in Inter-Frequency Measurement", R2-115166, 3GPP TSG RAN WG2 Meeting #74bis, Oct. 10-14, 2011, 3 pages.
Huawei, HiSilicon, "Remaining Issues when UE Performs Inter-Frequency RSTD Measurement", R4-110177, 3GPP TSG RAN WG4 (Radio) #57 AH, Jan. 17-21, 2011, 4 pages.
European Search Report dated Jun. 4, 2018 issued in counterpart application No. 15743200.6-1219, 9 pages.
Samsung, "Discussion on the Point of Time when Measurement Gap Starts", R4-132486, 3GPP TSG-RAN WG4 Meeting #67, May 20-24, 2013, 3 pages.
3GPP, 3GPP TS 36.133 V12.2.0, Draft_36133-c20_s00-10, Release 12, Dec. 2013, 137 pages.
Korean Office Action dated Oct. 29, 2020 issued in counterpart application No. 10-2015-0055604, 7 pages.
Chinese Office Action dated Nov. 16, 2021 issued in counterpart application No. 201910256208.2, 16 pages.

* cited by examiner

METHOD AND APPARATUS FOR MEASURING SERVING AND NEIGHBORING CELLS

PRIORITY

This application is a Continuation Application of U.S. patent application Ser. No. 16/049,176, filed on Jul. 30, 2018, which is a Continuation Application of U.S. patent application Ser. No. 14/771,736, filed on Oct. 29, 2015, issued as U.S. Pat. No. 10,038,538 on Jul. 31, 2018, and claims priority to the National Phase Entry of PCT International Application No. PCT/KR2015/000844, which was filed on Jan. 27, 2015, which claims priority to Korean Patent Application Serial No. 10-2014-0011761, which was filed Jan. 29, 2014, and Korean Patent Application Serial No. 10-2014-0055604, which was filed May 9, 2014, the contents of each of which are incorporated herein by reference.

BACKGROUND

1. Field of the Invention

The present invention relates generally to mobile communication systems, and more particularly, to a method and apparatus for measuring a serving cell and neighboring cells in transmitting or receiving data using multiple carriers in a mobile communication system.

2. Description of the Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, mobile communication systems have been developed for the purpose of providing communications while securing user mobility.

Fueled by rapid development of technologies, the mobile communication system has reached a stage of providing high-speed data communication services as well as voice communication.

In recent years, as one of next generation mobile communication systems, Long Term Evolution (LTE) systems are being standardized by the 3rd Generation Partnership Project (3GPP). The LTE system is a technology that implements high-speed packet-based communication with a transfer rate of up to about 100 Mbps, which is higher than the currently available data transfer rate, and the standardization has almost been completed.

A discussion about LTE-Advanced (LTE-A) communication system to increase transfer rates by combining various new technologies with the LTE communication system is heating up these days. The most famous one of the technologies to be newly introduced may be Carrier Aggregation (CA). CA implies that a user equipment (UE) uses multiple forward carriers and multiple uplink carriers unlike the conventional occasion where the UE only uses a single forward carrier and a single uplink carrier for data transmission and reception.

At present, only intra-evolved Node B (eNB) carrier aggregation is defined in the LTE-A. The intra eNB-carrier aggregation technology brings about a result of reducing applicability of the CA functionality, and especially in a scenario of operating multiple pico cells and a single macro cell one above the other, the macro cell and the pico cells might not be aggregated.

SUMMARY

The present invention has been made to address at least the above mentioned problems and/or disadvantages and to provide at least the advantages described below, and an aspect of the present invention provides a method and apparatus for inter-ENB carrier aggregation.

An aspect of the present invention provides a method and apparatus for selectively applying a measurement gap based on whether CA is available.

An aspect of the present invention provides a method and apparatus for selectively applying a measurement gap for each cell group in a case that CA is available.

An aspect of the present invention provides a method and apparatus for selectively applying a measurement gap for a single-frequency band or a complex-frequency band, and a structure of control information element (IE).

An aspect of the present invention provides a method and apparatus for applying a measurement gap for each transmission channel, such as Physical Random Access Channel (PRACH), backward grant, Physical Downlink Control Channel (PDCCH), Physical Hybrid-ARQ Indicator Channel (PHICH), Physical Downlink Shared Channel (PDSCH), Physical Uplink Shared Channel (PUSCH), Channel-Quality Indicator (CQI)/Channel Status Information (CSI), and Sounding Reference Signal (SRS).

An aspect of the present invention provides a method and apparatus for applying a measurement gap in a case that dual connectivity (DC) or Discontinuous Reception (DRX) is set up.

In accordance with an aspect of the present invention, there is provided a method for performing a measurement procedure by a user equipment (UE) in a wireless communication system supporting a DC is provided. The method includes receiving control information including measurement gap configuration information indicating gap configuration for at least one operating frequency band to which a measurement gap is applied; obtaining a system frame number (SFN) of a serving cell and a sub-frame of the serving cell based on the measurement gap configuration information; determining a first sub-frame of the measurement gap based on the SFN and the sub-frame; and performing a measurement on at least one serving cell including the serving cell at the first sub-frame.

In accordance with another aspect of the present invention, there is provided a UE for performing a measurement procedure in a wireless communication system supporting a DC. The UE includes a transceiver; and a controller configured to control the transceiver, wherein the controller is configured to: receive control information including measurement gap configuration information indicating gap configuration for at least one operating frequency band to which a measurement gap is applied, obtain an SFN of a serving cell and a sub-frame of the serving cell based on the measurement gap configuration information, determine a first sub-frame of the measurement gap based on the SFN and the sub-frame, and perform a measurement on at least one serving cell including the serving cell at the first sub-frame.

In accordance with another aspect of the present invention, there is provided a method for performing a measurement procedure by a base station in a wireless communication system supporting DC. The method includes transmitting control information including measurement gap configuration information indicating gap configuration for at least one operating frequency band to which a measurement gap is applied, wherein an SFN of a serving cell and a sub-frame of the serving cell is obtained based on the measurement gap configuration information, wherein a first sub-frame of a measurement gap is determined based on the SFN and the sub-frame, and wherein the measurement gap is performed on at least one serving cell including the serving cell at the first sub-frame.

In accordance with another aspect of the present invention, there is provided base station for performing a measurement procedure in a wireless communication system supporting DC. The base station includes a transceiver; and a controller configured to control the transceiver, wherein the controller is configured to transmit control information including measurement gap configuration information indicating gap configuration for at least one operating frequency band to which a measurement gap is applied, wherein an SFN of a serving cell and a sub-frame of the serving cell is obtained based on the measurement gap configuration information, and wherein a first sub-frame of a measurement gap is determined based on the SFN and the sub-frame, and wherein the measurement gap is performed on at least one serving cell including the serving cell at the first sub-frame.

In accordance with the present invention, enabling inter-eNB carrier aggregation may increase transmission and reception speeds of the UE while allowing efficient use of scheduling resources.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Embodiments of the present invention will now be described with reference to accompanying drawings. Descriptions of some well-known technologies that possibly may obscure the disclosure will be omitted, if necessary. Further, terms, as will be mentioned later, are defined by taking functionalities of the present invention into account, but may vary depending on certain practices or intentions of users or operators. Accordingly, the definition of the terms should be made based on the descriptions throughout this specification.

Prior to explaining embodiments of the present invention several terms used in this specification will be described first. However, it will be appreciated that those terms are not limited to what will be described below.

As described herein, a base station is an entity for communicating with an UE and may also be referred to as BS, Node B (NB), eNode (eNB), Access Point (AP), etc.

UE is an entity for communicating with the eNB and may also be referred to as UE, Mobile Station (MS), Mobile Equipment (ME), device, terminal, etc.

Figure 1:
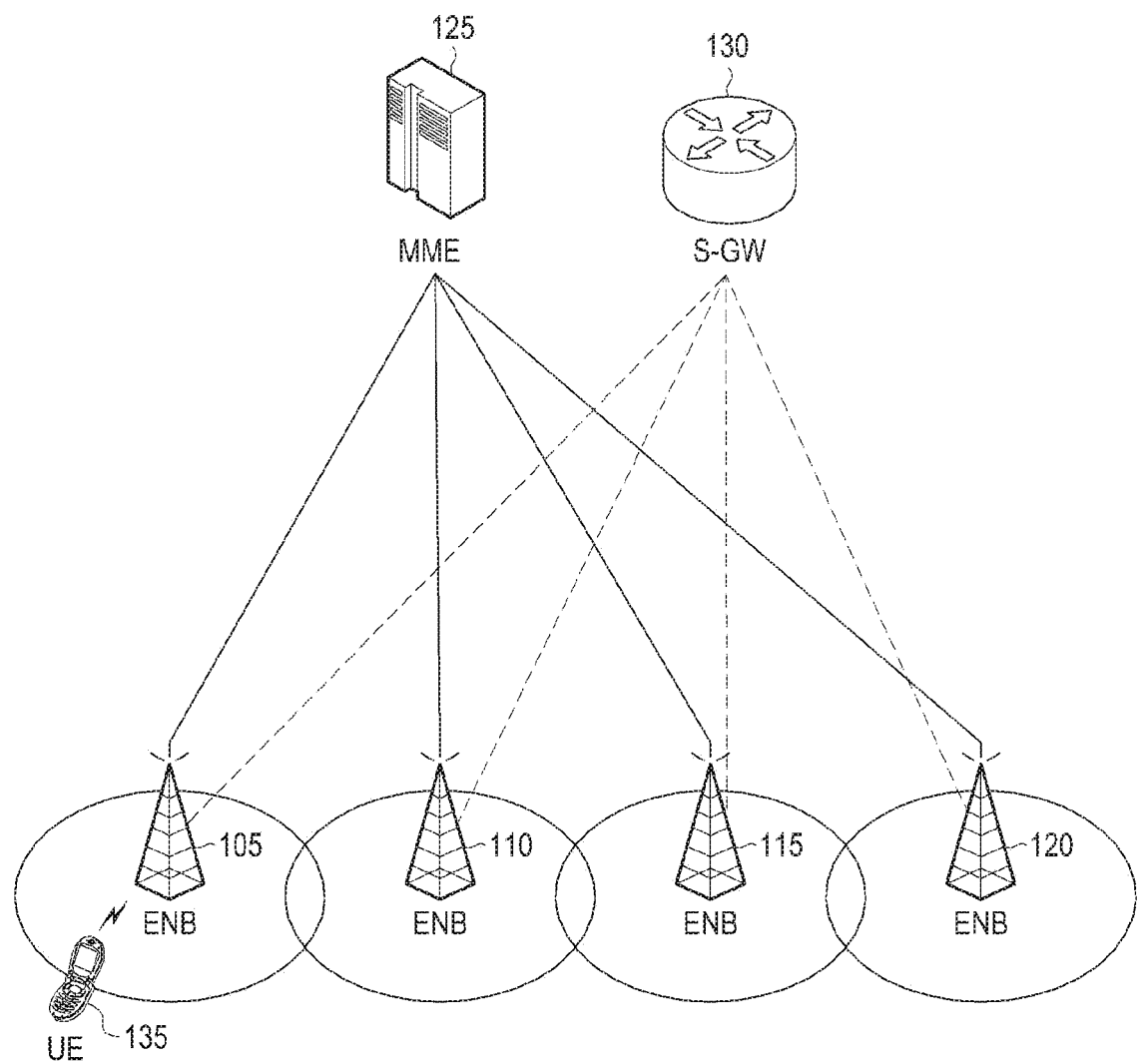
FIG. 1 is a diagram illustrating a structure of an LTE system.

FIG. 1 is a diagram illustrating a structure of an LTE system.

Referring to FIG. 1, a radio access network of the LTE system includes evolved Node Bs (hereinafter, also referred to as ENBs (or eNBs), Node Bs, or Base Stations (BSs)) 105, 110, 115, 120, a Mobility Management Entity (MME) 125, and a Serving Gateway (S-GW) 130. UE or terminal 135 may access an external network via at least one of the ENBs 105, 110, 115, 120 and the S-GW 130.

In FIG. 1, the ENBs 105, 110, 120 may correspond to Node Bs of a Universal Mobile Telecommunications System (UMTS) system. The ENBs 105, 110, 115, 120 may be connected to the UE 135 via radio channels and may play more complicated roles than the existing Node Bs do.

In the LTE system, all user traffic including real-time services, such as Voice over IP (VoIP) services according to an Internet protocol may be served on a shared channel, so a device to collect status information, such as buffer status of UEs, available transmission power status, channel condition, etc., for scheduling is required, and the ENB 105, 110, 115, 120 may serve as the device. One of the ENBs 105, 110, 115, 120 may typically control multiple cells. To achieve 100 Mbps of transmission speed, the LTE system may use Orthogonal Frequency Division Multiplexing (OFDM) in 2 Hz of bandwidth as a radio access technology.

The ENBs 105, 110, 115, 120 may also employ an Adaptive Modulation & Coding (AMC) scheme that determines a modulation scheme and channel coding rate based on the channel condition of the UE 135.

The S-GW 130 may be a device to provide data bearers, producing or eliminating data bearers under control of the MME 125.

The MME 125 is a device in charge of various control functions as well as a mobility management function for the UE 135, and may be connected to a number of eNBs.

Figure 2:
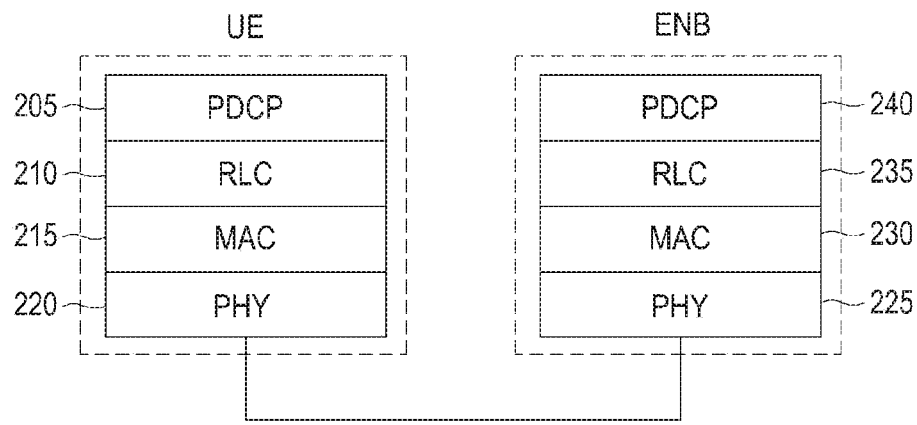
FIG. 2 is a diagram illustrating a wireless protocol structure of an LTE system.

FIG. 2 is a diagram illustrating a radio protocol architecture in an LTE system.

Referring to FIG. 2, the radio protocol of the LTE system in the UE and ENB may include Packet Data Convergence Protocol (PDCP) 205, 240, Radio Link Control (RLC) 210, 235, and Medium Access Control (MAC) 215, 230. Furthermore, the radio protocol of the LTE system may further include Physical (PHY) 220, 225 in the UE and ENB.

The PDCP 205, 240 may be responsible for IP header compression/decompression.

The RLC 210, 235 may reconfigure a PDCP Packet Data Unit (PDU) to be in a proper size, and perform Automatic Repeat reQuest (ARQ).

The MAC 215, 230 may be connected to a number of RLC layer devices configured in a single UE, for multiplexing RLC PDUs to a MAC PDU and demultiplexing RLC PDUs from a MAC PDU.

The PHY 220, 225 may perform channel coding and modulation on upper layer data and make them into an OFDM symbol for transmission on a radio channel, or perform demodulation and channel decoding on an OFDM symbol received on a radio channel and deliver the result to an upper layer.

Figure 3:
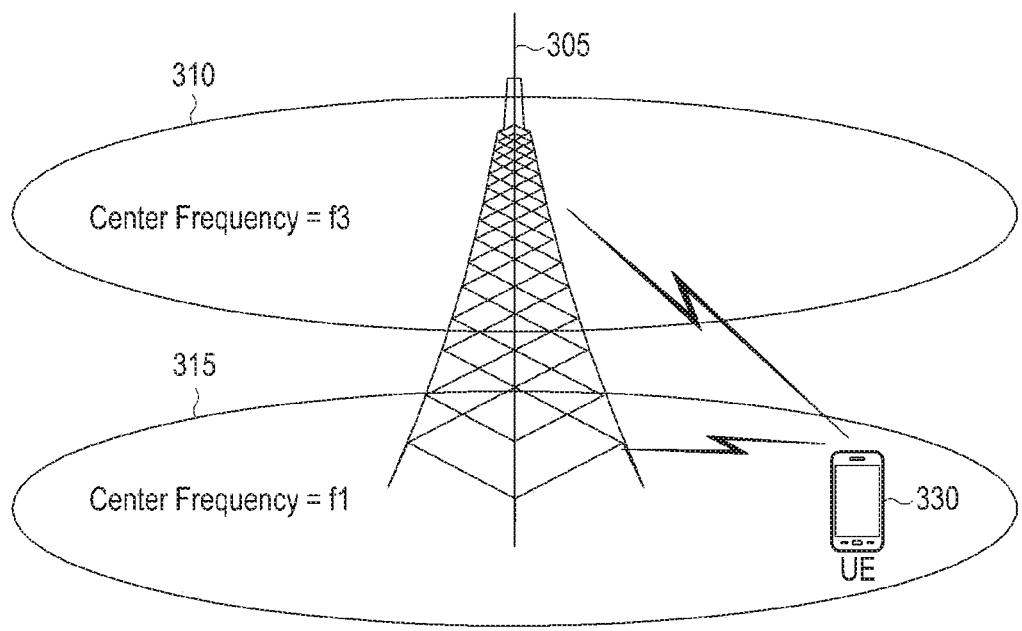
FIG. 3 is a diagram illustrating intra-eNB carrier aggregation.

FIG. 3 is a diagram illustrating carrier aggregation in an eNB.

Referring to FIG. 3, an eNB may typically transmit and receive multiple carriers over multiple frequency bands.

For example, when an eNB 305 transmits a carrier 315 having forward (i.e., downlink) center frequency f1 and a carrier 310 having forward center frequency f2, in a conventional scheme, a UE transmits or receives data using one of the two carriers. On the contrary, UE 330, which is capable of carrier aggregation, may transmit or receive data with multiple carriers 310 and 315 at the same time. The eNB 305 may increase the transmission speed of the HE 330 by allocating more carriers to the UE 330 capable of carrier aggregation depending on situation. As described above, aggregation of forward carriers or uplink carriers transmitted or received by an eNB is called intra-ENB CA. However, in some instances, unlike what is shown in FIG. 3, it may be necessary to aggregate forward carriers or uplink carriers transmitted or received by different eNBs.

Figure 4:
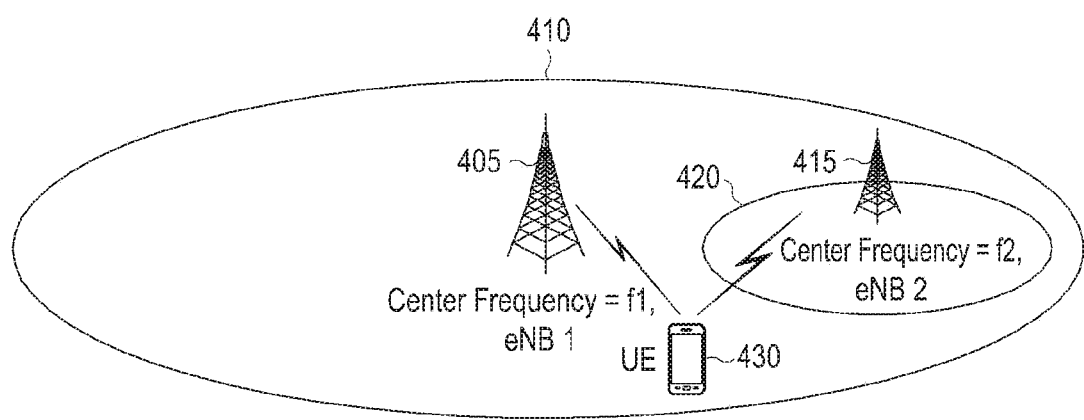
FIG. 4 is a diagram illustrating a carrier aggregation method, according to an embodiment of the present invention.

FIG. 4 is a diagram illustrating a carrier aggregation method, according to an embodiment of the present invention.

Referring to FIG. 4, when a UE 430 aggregates (or combines) carriers with forward center frequencies f1 and f2 while eNB 1 405 transmits or receives a carrier with the center frequency f1 and eNB 2 415 transmits or receives the carrier with center frequency f2, it ends up that a single UE aggregates carriers transmitted or received from two or more eNBs, which is herein referred to as inter-ENB CA. The inter-ENB CA may also be represented as Dual Connectivity (DC). For example, setting up the DC indicates that inter-ENB CA is set up, one or more cell groups are set up, a Secondary Cell Group (SCG) is set up, at least one Secondary serving Cell (SCell) controlled by other eNB than a serving eNB is set up, a primary SCell (pSCell) is set up, a MAC entity for a Slave eNB (SeNB) is set up, or two MAC entities are set up in a UE.

Assuming, in the traditional sense, that a forward carrier transmitted by an eNB and an uplink carrier received by the eNB constitute a single cell, CA may be understood to mean that a UE simultaneously transmits or receives data over a number of cells. In this regard, the maximum transmission speed and the number of carriers are positively correlated.

As described herein, a UE receiving data with a forward carrier or transmitting data with an uplink carrier is the same as a UE that receives or transmits data using a control channel and a data channel provided by a cell corresponding to a frequency band and a center frequency that characterizes the carrier. The CA may be represented as 'setting up multiple serving cells', and terms like PCell, SCell, activated serving cell, or the like may be used. The terms have the same meanings as used in LTE mobile communication systems. As described herein, the terms carriers, component carriers, serving cells, etc., may be used interchangeable.

A set of serving cells controlled by the same eNB may be referred to as a Cell Group (CO) or a Carrier Group (CG). The CG may be divided into a Master Cell Group (MCG) and a Secondary Cell Group (SCG). An MCG refers to a set of serving cells controlled by an eNB that controls the PCell (hereinafter, a master eNB, MeNB), and an SCG refers to a set of serving cells controlled by another eNB different from the eNB that controls the PCell i.e., by an eNB that only controls SCells (hereinafter, slave eNBs, SeNBs). Whether a certain serving cell belongs to the MCG or SCG may be provided by the eNB to the UE in the process of configuring the corresponding serving cell. An MCG and one or more SCGs may be configured in a single UE. For illustrative purposes, it is assumed that the SCG is configured in a single UE.

As used herein, PCell and SCell are terms that represent types of serving cells configured in the UE. There are several differences between PCell and SCell; for example, PCell always remains activated while SCell may be activated or inactivated according to instructions of the eNB. Mobility of the UE may be controlled with respect to PCell, and SCell may be understood as an additional serving cell for data transmission and reception. As used herein, PCell and SCell refer to the PCell and SCell, respectively, defined in the LTE standard (specification) 36.331 or 36.321.

As used herein, a macro cell is a cell controlled by an eNB and provides services in a rather wide coverage. On the contrary, a pico cell is a cell controlled by an SeNB and provides services in a remarkably small coverage as compared to a normal macro cell. Although there is no strict criteria that differentiates between the macro cell from the pica cell, it may be assumed, for example, that the coverage of the macro cell has a radius of about 500 m and the coverage of the pico cell has a radius of a few meters, e.g., ten meters. As used herein, the term pico cell may be interchangeable with the term 'small cell'.

Referring to FIG. 4, if eNB 1 405 is an MeNB and eNB 2 415 is an SeNB, a serving cell 410 with a center frequency f1 is a serving cell that belongs to an MCG while a serving cell 420 with a center frequency f2 is a serving cell that belongs to an SCG.

Other terms may be used instead of the terms MCG and SCG. For example, 'MCG' and 'secondary set' may be used, or the terms 'primary carrier group' and 'secondary carrier group' may be used. However, it should be noted that in this case, although called different names, the terms may have the same meaning. The main purpose of using these terms is to distinguish between which cell is controlled by an eNB for controlling the PCell of a particular UE, and ways in which the UE and the corresponding cell operate may depend on whether the cell is controlled by the eNB for controlling the PCell of the particular UE or not.

As noted above, one or more SCGs may be configured in the UE, but for convenience of explanation, it is assumed that a maximum of one SCG may be configured in the UE. An SCG may include a number of SCells, among which one SCell may have a special attribute.

With CA in a normal eNB, the UE sends not only Hybrid Automatic Repeat reQuest (HARQ) feedback and Channel State Information (CSI) for the PCell but also HARQ feedback and CSI for the SCell, on a PUCCH of the PCell. This is to apply CA even for a UE that is incapable of simultaneous uplink transmission.

In the case of inter-eNB CA, it may be practically impossible to transmit HARQ feedback and CSI of SCells on the PUCCH of a PCell. This is because the HARQ feedback should be delivered in a HARQ Round Trip Time (RTT, typically 8 ms) but the transmission delay between MeNB and SeNB might be longer than the HARQ RTT. Due to this problem, PUCCH transmission resources may be set up for one of SCells belonging to an SCG, and the HARQ feedback, CSI, and the like, for the SCells may be transmitted on the PUCCH. The particular SCell is called a primary SCell (pSCell).

In a mobile communications system like LTE, the UE performs measurement on a serving cell and a neighboring cell at predetermined intervals, processes and estimates the measurements, and sends a measurement report message to an eNB according to the estimation result.

Measurements performed by the UE may be largely divided into serving frequency measurement and non-serving frequency measurement, and the UE may pause data transmission and reception in the current serving cell to perform the non-serving frequency measurement in particular. The non-serving frequency measurement refers to a measurement on a carrier frequency with a center frequency that is different from that of the serving cell of the UE, and is also called inter-frequency measurement. The UE that performs the non-serving frequency measurement may use an extra Radio Frequency (RF) circuit, or may use a non-serving frequency by changing a frequency of a currently used RF circuit to the non-serving frequency.

If the UE uses the currently used RF circuit, the UE performs measurement during a time interval called a measurement gap indicated by the eNB in advance, such that the serving cell may not transmit data to the UE nor request the UE to send data to the serving cell while the UE is performing the measurement.

The measurement gap may be repeatedly generated at predetermined intervals. The measurement gap may begin at a starting point of time of a certain sub-frame and may last, for example, 6 ms. If the sub-frame in which the measurement gap starts is specified with a parameter gapOffset, measurement gap configuration information may include at least one of the following sub-information:

gapOffset: information specifying the sub-frame where the measurement gap starts. An integer between 0 to 79 or 0 to 39.

information regarding gap repetition period: information indicating whether the gap repetition period is 40 ms or 80 ms.

The UE uses at least one of the above information to specify a time interval corresponding to the measurement gap, and does not receive downlink signals of the serving cell nor transmit uplink signals from the serving cell during the measurement gap.

Figure 5:
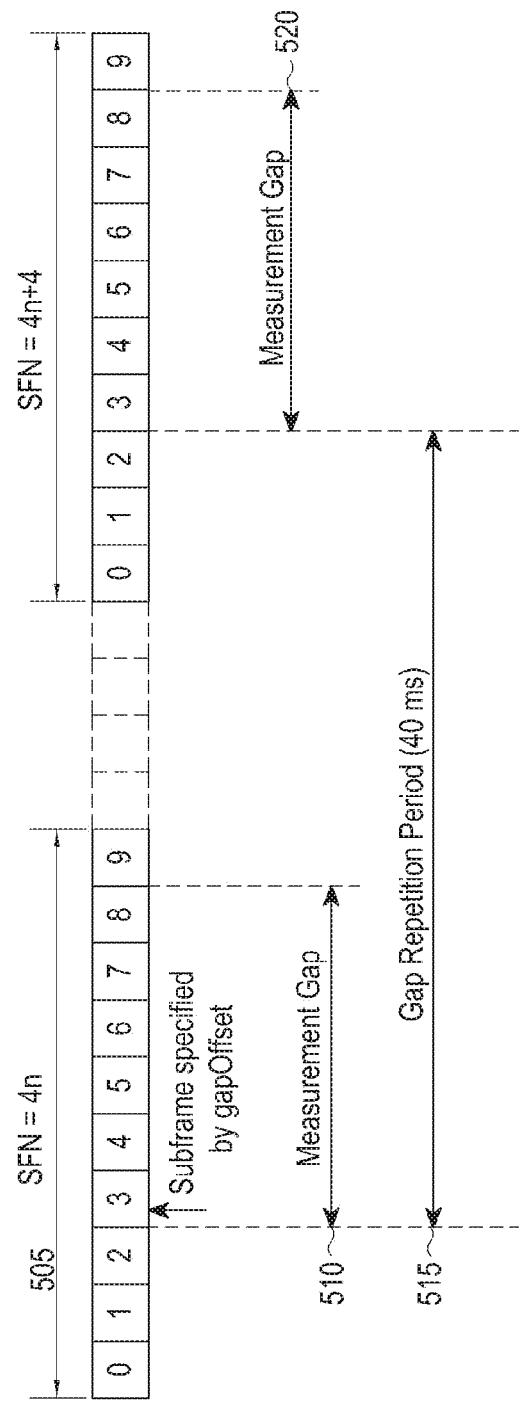
FIG. 5 is a diagram illustrating an example of configuring a measurement gap, according to an embodiment of the present invention.

FIG. 5 is a diagram illustrating an example of configuring a measurement gap, according to an embodiment of the present invention.

Referring to FIG. 5, if gapOffset is 3 and the gap repetition period is set to 40 ms, the measurement gap is formed based on sub-frame [3] 505 of a radio frame whose System Frame Number (SFN) is a multiple of 4. For example, a first measurement gap 510 starts at a starting point of time of the sub-frame [3] 505 and lasts for 6 ms. A second measurement gap 520 then starts in a sub-frame after the lapse of 40 ms from the starting point of the first measurement gap 510. Even if the measurement on the non-serving frequency has been completed, the measurement gap may be repeatedly generated until it is released by the eNB.

The UE and the eNB need to make an agreement in advance on which serving cell the measurement gap is to be applied for, with respect to the UE in which a number of serving cells are configured.

Figure 6:
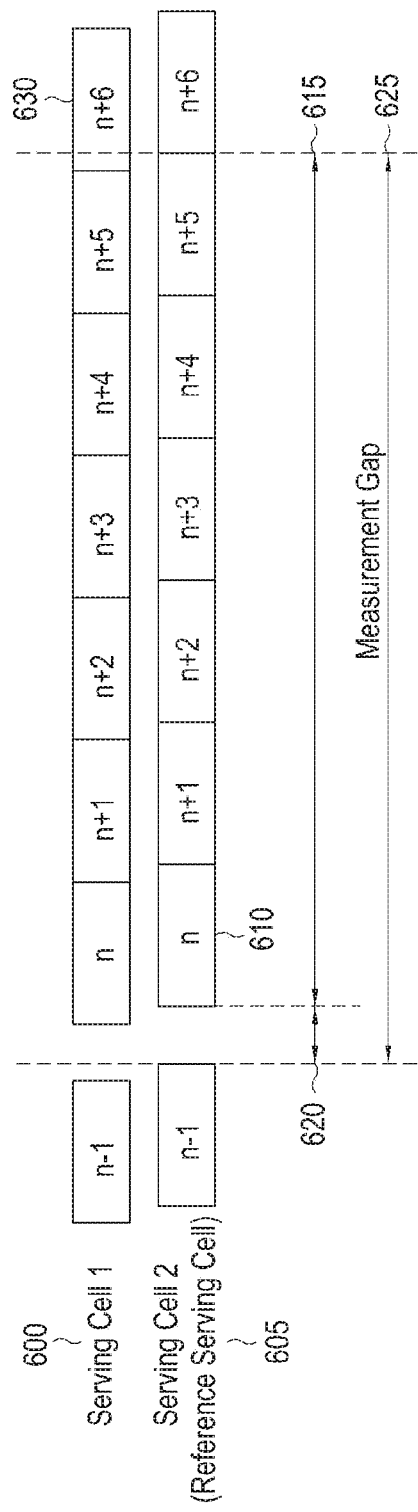
FIG. 6 is a diagram illustrating a reference serving cell, reference sub-frame, and measurement gap, according to an embodiment of the present invention.

FIG. 6 is a diagram illustrating a reference serving cell, reference sub-frame, and measurement gap, according to an embodiment of the present invention.

A measurement gap is applied for all the serving cells, wherein which sub-frame is to be included in the measurement gap for each serving cell is determined as follows:

The UE first determines a reference serving cell by determining whether a predetermined condition (hereinafter, a reference serving cell condition) is met. For example, if serving cell (2) 605 is determined as the reference serving cell, the UE calculates a radio frame related to the measurement gap, taking into account Equation (1) and an SFN of the reference serving cell. The UE then calculates a sub-frame number of the first sub-frame of the measurement gap, taking into account Equation (2) and a sub-frame number of the reference serving cell. A sub-frame specified by the Equations 1 and 2 is the reference sub-frame, wherein Equations (1) and (2) are as follows:

SFN mod $T$=FLOOR(gapOffset/10)

$T$=gap repetition period/10      (1)

Subframe=gapOffset mod 10      (2)

For example, if sub-frame n 610 is the reference sub-frame, the UE determines a set of sub-frames to be included in the measurement gap based on the reference sub-frame. For example, the set of sub-frames may be 6 successive sub-frames including the reference sub-frame. The UE may then determine a measurement gap 625 by combining a time interval 615 specified by the set of sub-frames included in the measurement gap and a time interval 620 specified by a gap between the reference sub-frame and a sub-frame right before the reference sub-frame. The gap 620 between the reference sub-frame and the sub-frame right before the reference sub-frame may or may not exist.

If serving cell (1) 600 is a cell that operates in Time Division Duplex (TDD) mode, and sub-frame n is a downlink (i.e., forward) sub-frame while sub-frame n−1 is an uplink sub-frame, there may be a gap between the two sub-frames as wide as a Timing Advance (TA), and the gap created by the TA is to be included in the measurement gap, thereby increasing an actual length of the measurement gap while keeping the number of sub-frames influenced by the measurement gap the same. If the sub-frame n−1 and sub-frame n are both the uplink sub-frames or both the downlink sub-frames, the gap as wide as the TA may not exist, and the measurement gap may only be defined as a set of, for example, six sub-frames.

Sub-frame boundaries of the reference serving cell and a serving cell that is not the reference serving cell (hereinafter a non-reference serving cell) may not exactly correspond to each other, and only a part of the non-reference serving cell may be included in the measurement gap. For example, in FIG. 6, as for sub-frame [n+6] 630 of the non-reference serving cell, the UE and the eNB may not perform data transmission and reception even in the sub-frame 630, only a part of which is included in the measurement gap as described above.

The UE and the eNB may determine a reference serving cell so as to form a measurement gap for the longest time interval, which has the least influence on data transmission and reception. For example, in FIG. 6 data transmission and reception may not be performed in sub-frame [n−1] of the serving cell (2) if the serving cell (1) 600 is used as the reference cell, and data transmission and reception may not be performed in sub-frame [n+6] of the serving cell (1) if the serving cell (2) is used as the reference cell. Since a data transmission command for the sub-frame [n+6] generally occurs in sub-frame [n+2] that belongs to the measurement gap, probability of performing data transmission and reception in the sub-frame [n+6] is remarkably lower than that in the sub-frame [n−1]. Accordingly, one of the currently activated serving cells, whose sub-frame right before the reference sub-frame ends, may be used as a reference serving cell. In other words, the measurement gap may start at an ending point of one of the sub-frames right before sub-frames that meet the Equations (1) and (2) among the currently activated serving cells, whose ending point is the latest, and may last for six sub-frames after the starting point.

Figure 7:
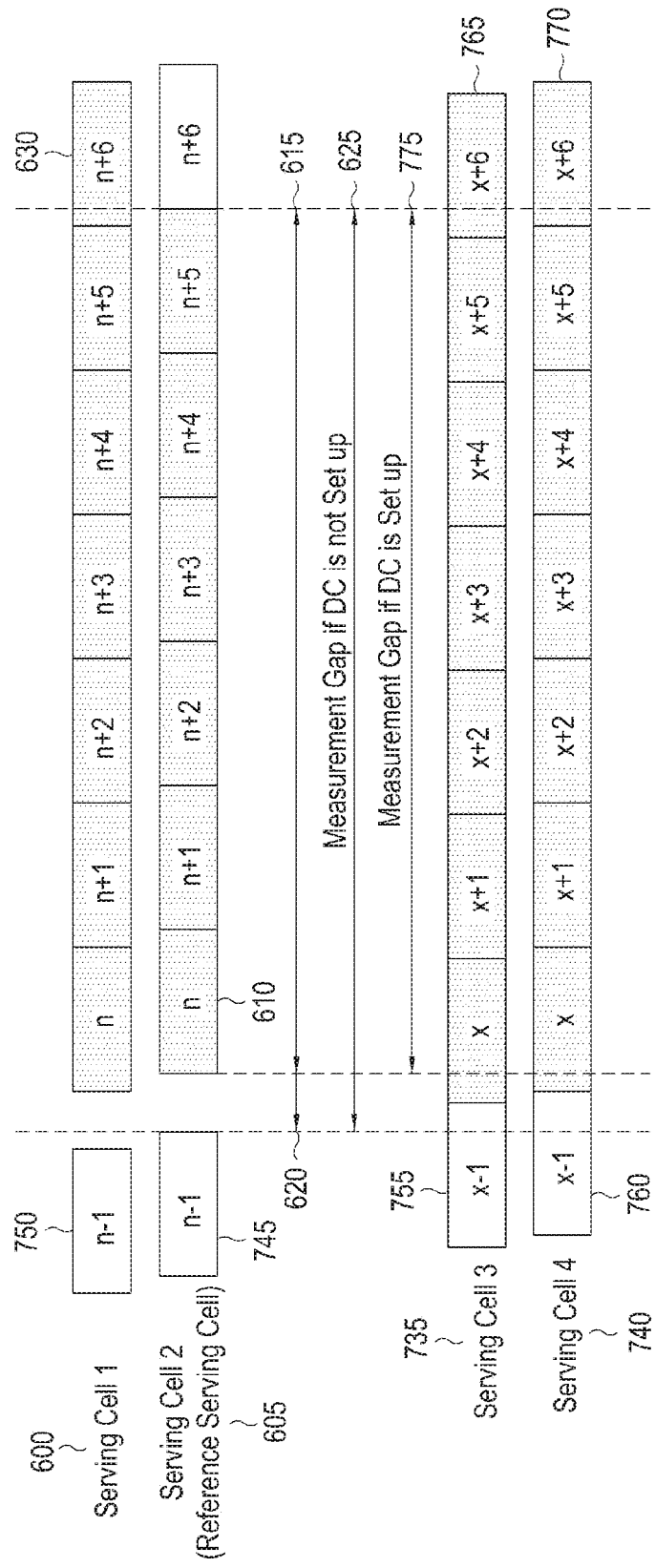
FIG. 7 is a diagram illustrating another reference serving cell, reference sub-frame, and measurement gap, according to an embodiment of the present invention.

FIG. 7 is a diagram illustrating another reference serving cell, reference sub-frame, and measurement gap, according to an embodiment of the present invention.

In a case that DC is set up, starting the measurement gap at an ending point of a sub-frame right before the reference sub-frame as described above may end up in failure of data transmission and reception in rather more sub-frames. This is because the MCG and SCG may operate in different duplex modes and the difference in sub-frame boundary between cell groups may be greater than the difference in sub-frame boundary in a cell group.

Assume a scenario, for example, where serving cell (1) 600 and serving cell (2) 605 is in the MCG, serving cell (3) 735 and serving cell (4) 740 are in the SCG, the duplex mode of the MCG serving cells is TDD, and the duplex mode of the SCG serving cells is Frequency Division Duplex (FDD). As shown in FIG. 7, if the measurement gap is configured based on the ending point of a sub-frame right before the reference sub-frame, as for the MCG serving cells, data transmission and reception in sub-frames [n−1] 745, 750, which are sub-frames right before the measurement gap, is normally performed. As for the SCG serving cells, normal data transmission and reception may not be performed because sub-frames [x−1] 755, 760 right before the measurement gap and sub-frames [x+6] 765, 770 right after the measurement gap both have at least part of them included in the measurement gap. On the contrary, if the measurement gap is configured based on the starting point of the reference sub-frame, influences on at least the sub-frames 755, 760 right before the measurement gap may be avoided.

Considering the above features, different rules are applied for occasions when DC is or is not set up in determining a starting point of the measurement gap. In an occasion when DC is not set up, the starting point of the measurement gap may be determined based on an ending point of a sub-frame right before the reference sub-frame, and in an occasion when DC is set up, the starting point of the measurement gap may be determined based on the starting point of the reference sub-frame. That is, in the example of FIG. 7, if DC is not set up (e.g., only an MCG but no SCG is set up), a measurement gap 625 may be used, and if DC is set up (e.g., SCG is set up), a measurement gap 775 may be used.

Figure 8:
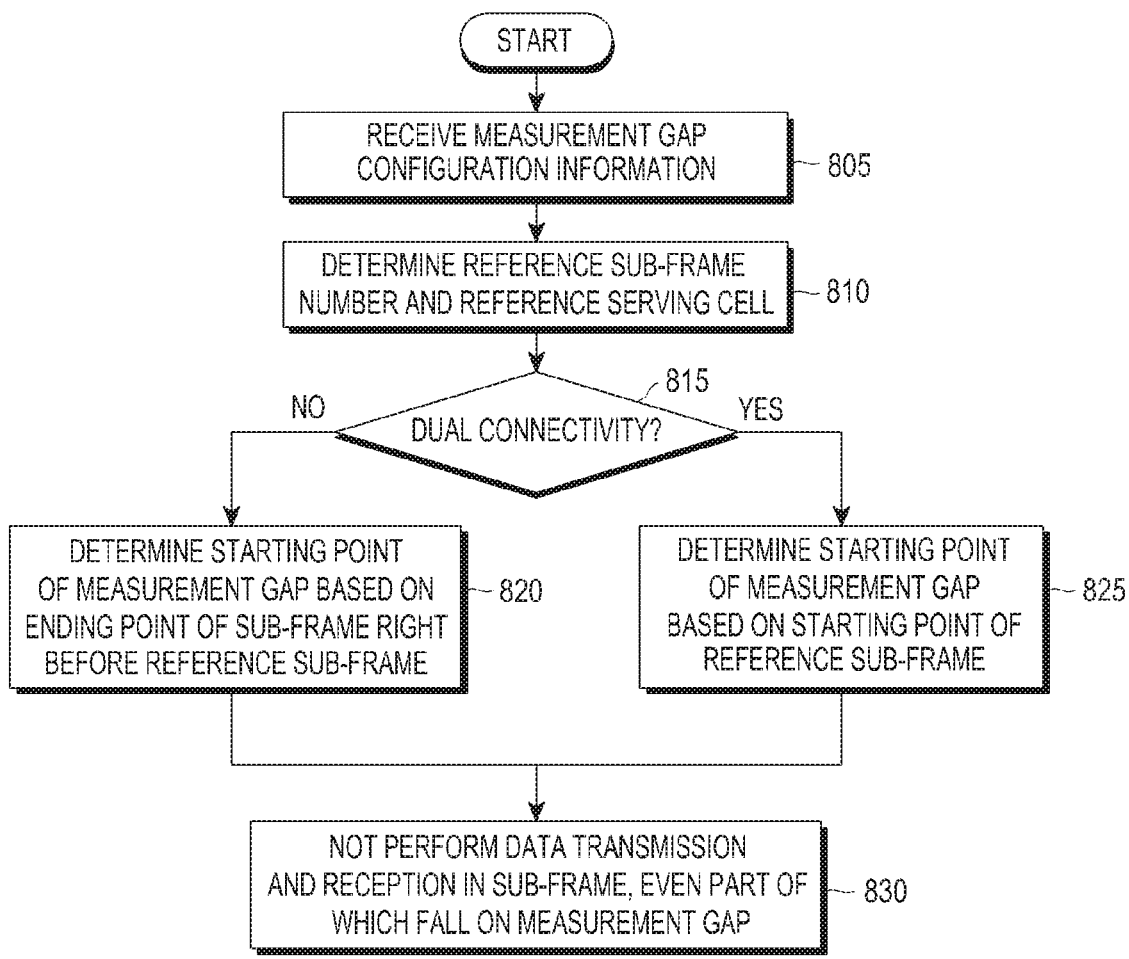
FIG. 8 is a flowchart illustrating a method of a User Equipment (UE) for configuring a measurement gap and determining a sub-frame to stop data transmission and reception, according to an embodiment of the present invention.

FIG. 8 is a flowchart illustrating a method of a UE for configuring a measurement gap and determining a sub-frame in which data transmission and reception is to be stopped, according to an embodiment of the present invention.

In step 805, the UE receives measurement gap configuration information from the MeNB.

In step 810, the UE determines a reference serving cell and a reference sub-frame. Determining the reference serving cell may use at least one of the following methods.

Reference Serving Cell Determination Method 1

Among currently activated serving cells, a serving cell whose sub-frame right before the reference sub-frame has the latest ending point is determined as the reference serving cell.

Reference Serving Cell Determination Method 2

Among currently activated serving cells, a serving cell whose reference sub-frame has the latest starting point is determined as the reference serving cell.

Reference Serving Cell Determination Method 3

Among currently activated serving cells, a predetermined arbitrary serving cell is determined as the reference serving cell. The predetermined serving cell may be, for example, a pSCell or PCell.

In applying the reference serving cell determination methods 1 and 2, it is also possible to select the reference serving cell only from among serving cells of a predetermined cell group. For example, among the currently activated MCG serving cells, a serving cell whose sub-frame right before the reference sub-frame has the latest ending point is determined as the reference serving cell, or a serving cell whose reference sub-frame has the latest starting point may be determined as the reference serving cell.

The UE may use at least one of Equation (1), Equation (2), SFN, and sub-frame number of the reference serving cell, to determine a sub-frame number of the reference sub-frame.

Alternatively, the UE may use Equation (1), Equation (2), SFN of a PCell, and a sub-frame number of the PCell to determine a sub-frame number of the reference sub-frame, and may use one of the reference serving cell determination methods to determine a reference serving cell.

In step 815, the UE checks whether DC is currently set up (or SCG is set up, pSCell is set up, or a MAC entity is set up for the SeNB). If it is determined in step 815 that DC is set up, the UE proceeds to step 825, or if it is determined in step 815 that DC is not set up, the UE proceeds to step 820.

In step 820, the UE determines a starting point of a measurement gap based on an ending point of a sub-frame right before the reference sub-fame, and determines an ending point of the measurement gap based on, for example, an ending point of six sub frames right after the starting point of the measurement gap among sub-frames of the reference serving cell. That is, the UE specifies a time interval that corresponds to the measurement gap. The time interval corresponding to the measurement gap calculated in step 820 is obtained using 'measurement gap specification method 1'.

In step 825, the UE determines a starting point of a measurement gap based on a starting point of the reference sub-fame, and determines an ending point of the measurement gap based on, for example, an ending point of six sub frames right after the starting point of the measurement gap among sub-frames of the reference serving cell. That is, the UE specifies a time interval that corresponds to the measurement gap. The time interval corresponding to the measurement gap calculated in step 825 is obtained using 'measurement gap specification method 2'.

In step 830, the UE does not perform data transmission and reception in a sub-frame, even a part of which falls on the time interval corresponding to the measurement gap. For example, if even a part of arbitrary sub-frame x of an arbitrary serving cell falls on the measurement gap time interval, the UE does not receive signals in the sub-frame even if reception of downlink signals is scheduled in the sub-frame. Alternatively, in step 830, the UE performs a measurement gap UE operation, as will be described greater detail below.

Figure 20:
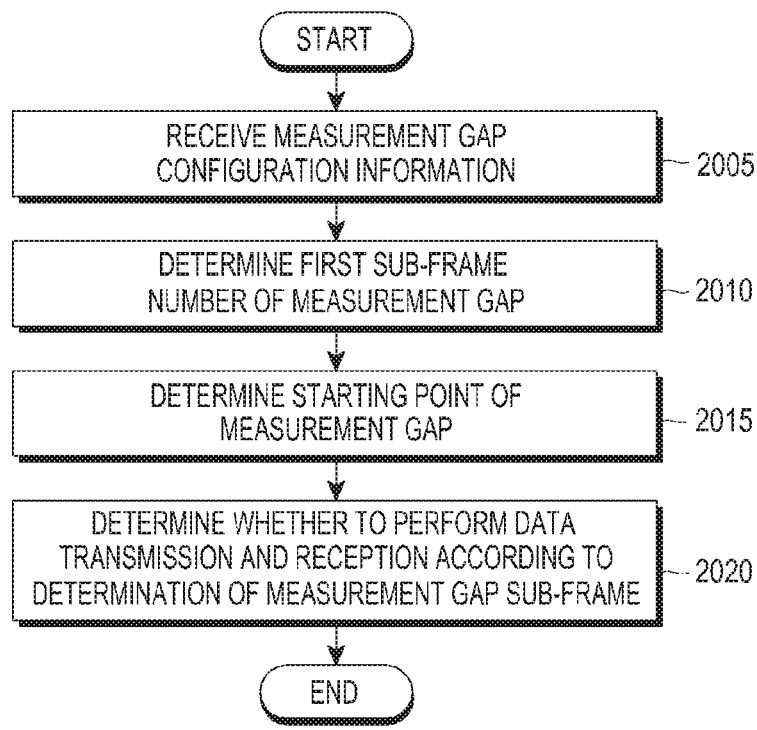
FIG. 20 is a flowchart of another example of operation of a UE, according to an embodiment of the present invention.

FIG. 20 is a flowchart of a method for another example of a UE operation, according to an embodiment of the present invention.

Referring to FIG. 20, in step 2005, the UE receives measurement gap configuration information from an eNB. A serving cell receiving the measurement gap configuration information and a serving cell to which the measurement gap is applied may be different from each other. For example, it is possible to generate a measurement gap using the measurement gap configuration information received at serving cell A and apply the generated measurement gap not to the serving cell A but to serving cell B. In another example, if the cell A receives the measurement gap configuration information and then hands it over to the cell B, the measurement gap configuration information received by the cell A may be actually applied to the serving cell B.

In step 2010, a first sub-frame number of the measurement gap is calculated. For example, the UE calculates the first sub-frame number of the measurement gap by inputting at least one of an SFN of the PCell and an SFN of an activated MCG serving cell to the Equation (1) and inputting at least one of the sub-frame number of the PCell and the sub-frame number of the activated MCG serving cell to the Equation (2). The measurement gap may be periodically repeated. As for the first sub-frame number, there may be one for each measurement gap.

In step 2015, the UE determines a starting point of the measurement gap by taking into account sub-frame boundaries of currently activated MCG serving cells. For example, the UE determines an ending point of a sub-frame that ends last to be a starting point of a measurement gap by taking into account ending points of sub-frames right before sub-frames corresponding to the first sub-frame number, among the sub-frames of currently activated MCG serving cells.

Figure 21:
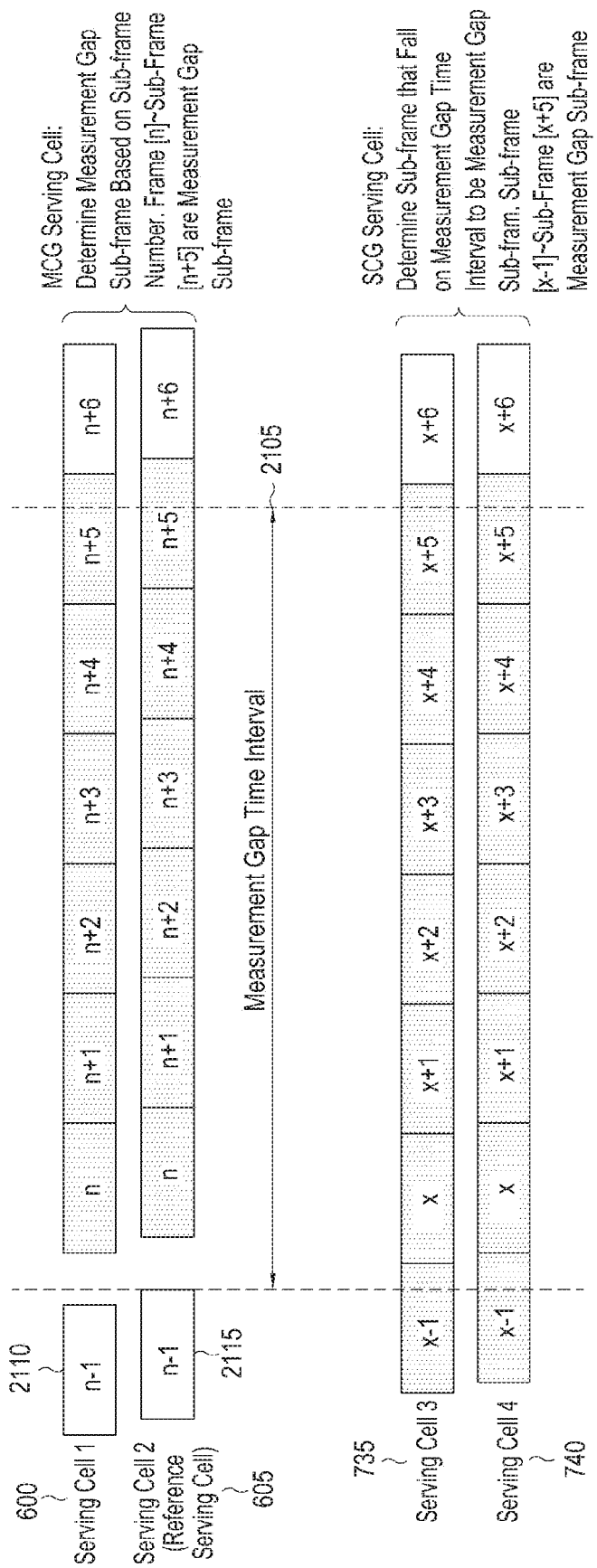
FIG. 21 is a diagram illustrating an example of determining a starting point of a measurement gap, according to an embodiment of the present invention.

FIG. 21 is a diagram illustrating an example of determining a starting point of a measurement gap, according to an embodiment of the present invention.

Referring to FIG. 21, assuming that first sub-frames of MCG serving cells, which are comprised of the serving cell 1 600 and serving cell (2) 605, are assigned sub-frame number n, and first sub-frames of SCG serving cells comprised of the serving cell (3) 735 and serving cell (4) 740 are assigned sub-frame number x.

Among the sub-frames [n−1] 2110, 2115 of the serving cell (1) 600 and serving cell (2) 605 corresponding to the MCG serving cells, an ending point of the sub-frame 2115 of the serving cell (2) 605 that ends last may be determined as the starting point of a measurement gap 2105.

The UE determines a measurement gap time interval based on the determined starting point. In step 2020, whether to perform data transmission/reception in the measurement gap sub-frames is determined according to determination of the sub-frames of the measurement gap.

For example, the UE determines sub-frames of the measurement gap of the currently activated MCG serving cells and sub-frames of the measurement gap of the currently activated SCG serving cells. Based on the determination results, the UE does not perform data transmission and reception in the sub frames of the measurement gap. In this case, the sub-frames of the measurement gap belong to the measurement gap time interval, i.e., sub-frames in which the UE and eNB do not transmit/receive uplink/downlink signals.

The sub-frames of the measurement gap of the MCG serving cells may be determined according to sub-frame numbers. The sub-frames of the measurement gap of the SCG serving cells may be determined according to whether they fall on the measurement gap time interval.

For example, referring to FIG. 21, the measurement gap 2105 is defined to have a time interval of 6 ms from the ending point of the sub-frame [n−1] of the serving cell (2) 605.

The measurement gap sub-frames of the MCG serving cells, serving cell (1) 600 and serving cell (2) 605, are specified by the first sub-frame calculated according to Equations (1) and (2), and five sub-frames subsequent to the first sub-frame. That is, the measurement gap sub-frames of the MCG serving cells are sub-frames whose sub-frame numbers are [n] to [n+5].

The measurement gap sub-frames of the SCG serving cells, serving cell (3) 735 and serving cell (4) 740, are specified by sub-frames, even a part of which falls on the measurement gap time interval 2105. That is, the measurement gap sub-frames of the SCG serving cells are sub-frames whose sub-frame numbers are [x−1] to [x+5].

In another example, even with the same rule applied to the MCG serving cells and SCG serving cells, measurement gap sub-frames may be determined. That is, without distinction of MCG serving cells from SCG serving cells, even determining sub-frames, even a part of which falls on the measurement gap time interval 2105, to be measurement gap sub-frames may obtain the same result.

Sub-frame numbers of the measurement gap sub-frames of the MCG serving cells are determined by the sub-frame number [n] assigned for the first sub-frame and sub-frame numbers [n+1] to [n+5] assigned for five sub-frames subsequent to the first sub-frame. The sub-frame number [n] assigned for the first sub-frame may be calculated using the Equation (1), Equation (2), an SFN of the PCell, a sub-frame number of the PCell, etc.

Sub-frame numbers of the measurement gap sub-frames of the SCG serving cells are determined by the sub-frame number [x−1] assigned for the first sub-frame and sub-frame numbers [x] to [x+5] assigned for six sub-frames subsequent to the first sub-frame. The sub-frame number [x−1] assigned for the first sub-frame may be determined by the number [x−1] of the sub-frame preceding other sub-frames, even a part of which falls on the measurement gap time interval 2105.

Since the UE or eNB does not perform data transmission and reception in the sub-frame, a part of which falls on the measurement gap, it is desirable to reduce the number of sewing cells influenced by the measurement gap.

As described above, using the measurement gap means performing inter-frequency measurement at a currently used RF. In the case that DC is set up, it is common to use separate RFs for the MCG and the SCG. Accordingly, configuring measurement gaps both for the MCG and the SCG degrades scheduling efficiency.

Accordingly, a method for applying the measurement gap only to a single cell group is provided. Once the DC is set up, most data is likely to be transmitted or received through the SCG. Accordingly, it is beneficial to apply the measurement gap only to the MCG in terms of data transmission and reception. However, measurements cannot be performed with the RF used for the MCG in some RF structure of the UE. In which case, the UE does not arbitrarily perform measurement on the corresponding frequency nor include the result of measuring the frequency in a measurement result report, and guides the eNB to recognize this situation (e.g., a situation unable to perform measurement with an RF used for the MCG due to the RF structure of the UE) and reconfigures the measurement.

Figure 9:
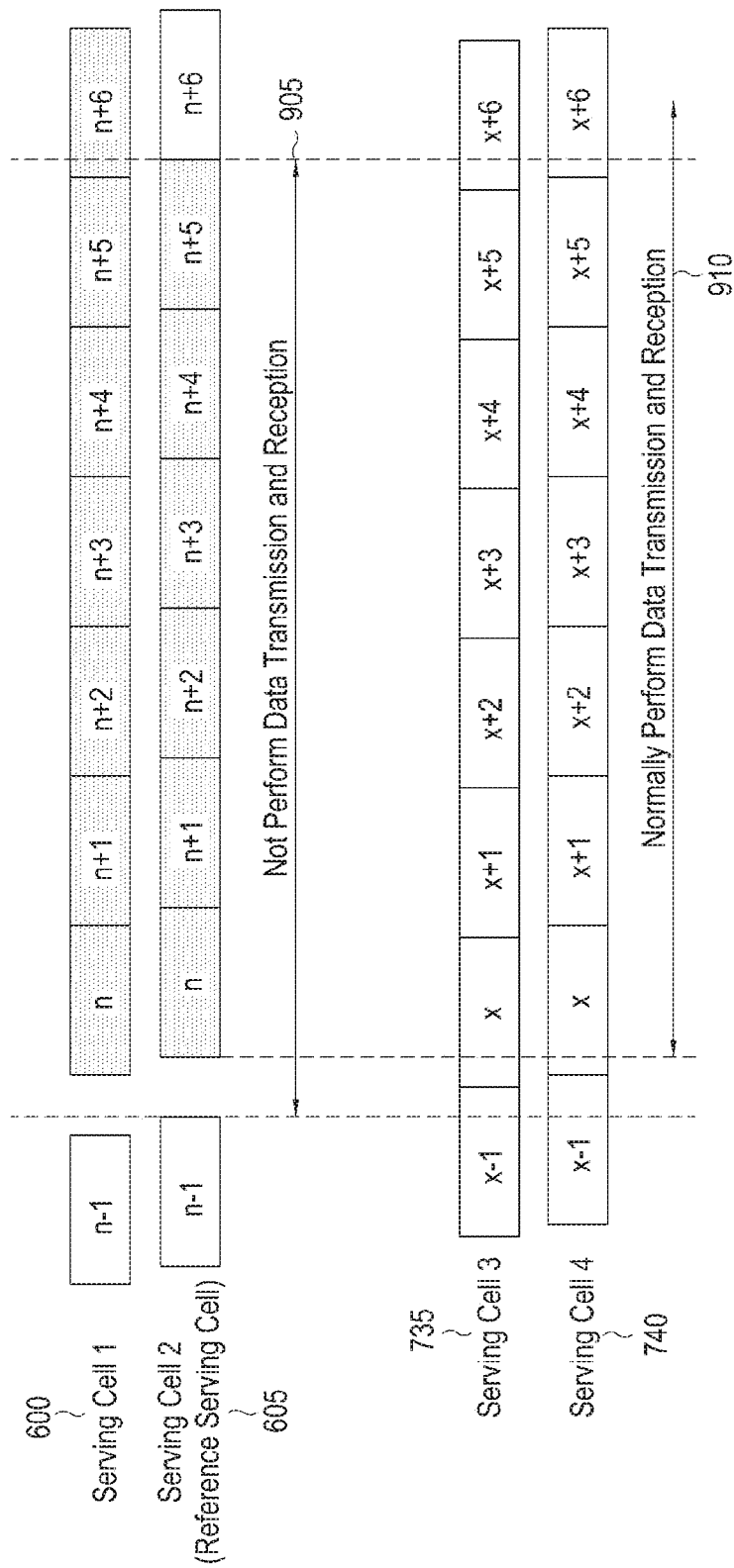
FIG. 9 is a diagram illustrating an example of a cell group measurement gap, according to an embodiment of the present invention.

FIG. 9 is a diagram illustrating an example of a cell group measurement gap, according to an embodiment of the present invention.

For example, with the serving cells (1) and (2) 600 and 605, respectively, belonging to an MCG and the serving cells (3) and (4) 735 and 740, respectively, belonging to an SCG, the UE applies the 'reference serving cell determination method 1' to determine one of the MCG serving cells to be the reference serving cell. A reference sub-frame may then be specified using the Equations (1) and (2), and then the 'measurement gap specification method 1' is applied to specify a measurement gap time interval. In sub-frames of the MCG serving cells among the sub-frames included in the measurement gap time interval, measurement gap UE operation is performed (as indicated by reference number 905). In sub-frames of the SCG serving cells, even though the sub-frames are included in the measurement gap time interval, normal data transmission and reception may proceed (as indicated by reference number 910).

Figure 10:
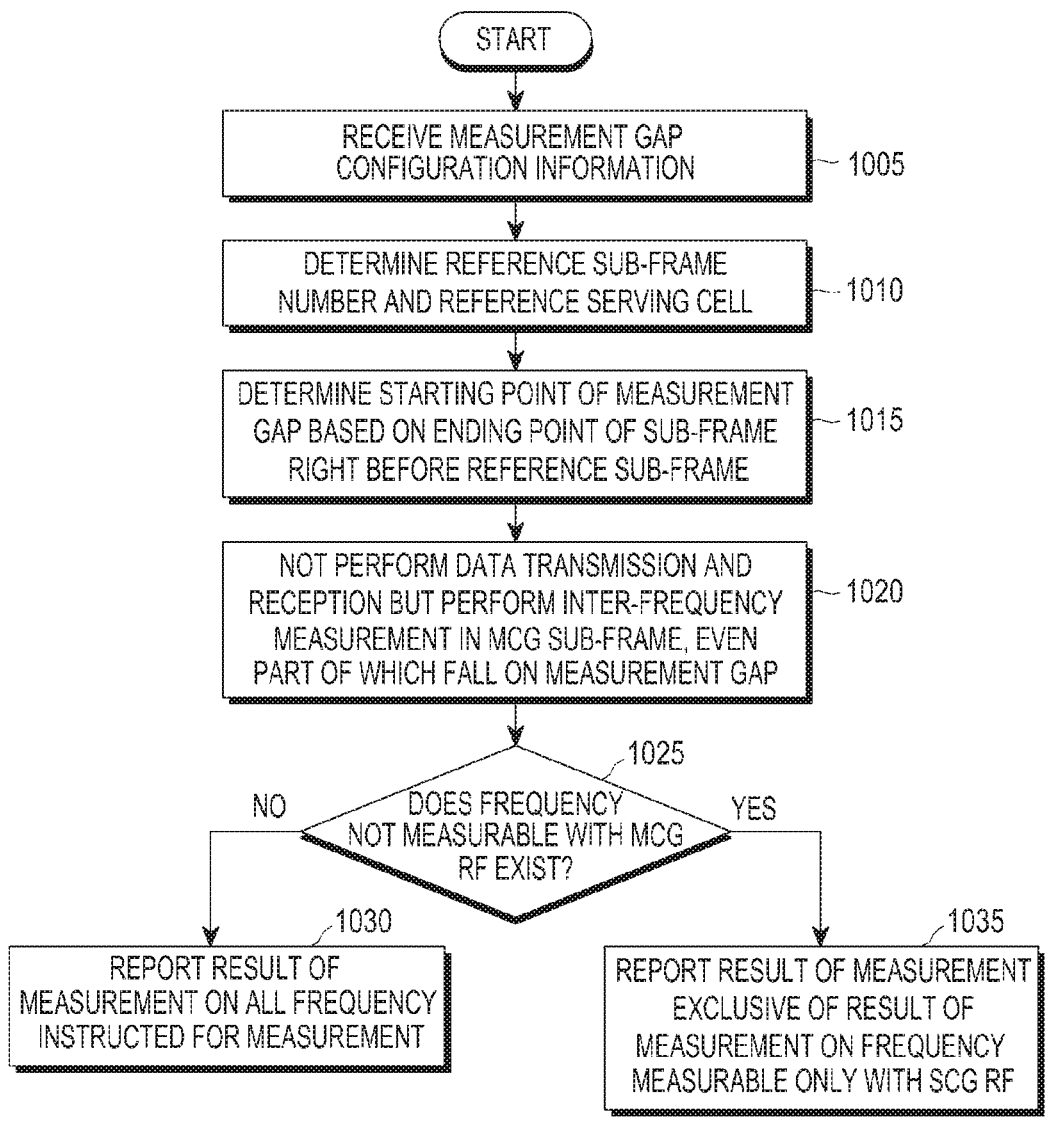
FIG. 10 is a flowchart illustrating a method of a UE for configuring a measurement gap, according to an embodiment of the present invention.

FIG. 10 is a flowchart illustrating a method of a UE operation for configuring a measurement gap, according to an embodiment of the present invention.

In step 1005, the UE receives configuration information of a measurement gap from an MeNB.

In step 1010, the UE determines one of the MCG serving cells to be a reference serving cell using one of the reference cell determination methods and determines a reference sub-frame using at least one of the Equations (1) and (2), an SFN and sub-frame number of the PCell.

In step 1015, the UE determines a starting point of a measurement gap based on an ending point of a sub-frame right before the reference sub-fame and determines an ending point of the measurement gap based on, for example an ending point of six sub-frames right after the starting point of the measurement gap among sub-frames of the reference serving cell. That is, the UE specifies a time interval corresponding to the measurement gap.

In step 1020, the UE performs inter-frequency measurement using an RF used for MCG serving cell signal transmission and reception, instead of performing data transmission and reception in the sub-frames, even a part of which falls on the measurement gap, among sub-frames of the MCG serving cells. In the SCG serving cells, the UE performs data transmission and reception even in the subframes that fall on the measurement gap. If there is a frequency that cannot be measured with the RF among the frequencies instructed for measurement, the UE determines that the measurement gap has not been configured and, accordingly, may not perform the measurement.

In step 1025, the UE checks if there is a frequency that cannot be measured with the MCG RF, among the frequencies instructed for measurement or if there is an RF possible to be measured by using an SCG RF. If there is the frequency (that cannot be measured with the MCG RF), the method proceeds to step 1035, or else if there is no such a frequency, the process proceeds to step 1030.

In step 1030, the UE may constantly manage results of measurements on the frequencies instructed for measurement, and report the measurement results to the eNB when a predetermined event occurs.

In step 1035, the UE may not perform measurements on the frequencies that may be measured with the SCG RF, and reports measurement results for the remaining frequencies except for the measurement result for frequencies that are measurable only with the SCG RF to the eNB when an event to report the measurement result occurs.

A method for applying the measurement gap only to a particular cell group is provided.

In reporting its performance to the eNB, the UE may also report information (hereinafter, CellGroupMeasGap) indicating which serving frequency band the measurement gap is to be configured (or applied) for to perform measurement on a frequency band.

The eNB determines which cell group the measurement gap is to be configured for, by taking into account the performance information of the UE and a set measurement object. The eNB sends the UE information indicating which cell group the measurement gap is for in the measurement gap configuration information, and the UE configures the measurement gap only for the particular cell group according to the indication.

Figure 11:
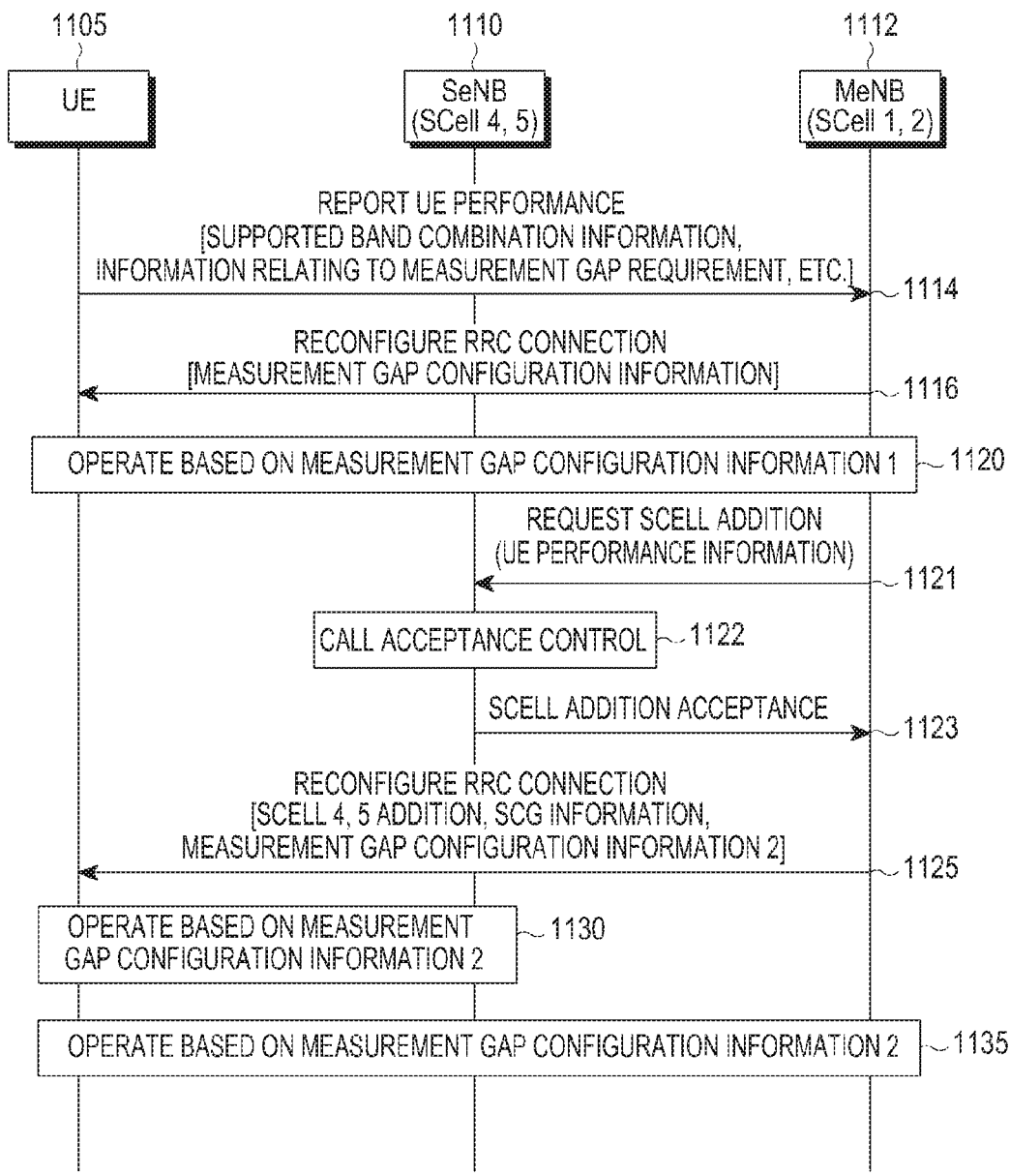
FIG. 11 is a flowchart illustrating a method of a UE and eNBs, according to an embodiment of the present invention.

FIG. 11 is a signally diagram illustrating a method of a UE and eNBs, according to an embodiment of the present invention.

In step 1114, a UE 1105 reports to an MeNB 1112 of its performance. The performance report message may include at least one of information about a band combination that the UE 1105 supports and information indicating whether the measurement gap is necessary for each band combination. Specifically, at least one of rf-Parameters, rf-Parameters-v1020, MeasParameters-v1020, and MeasParameters-v12 may be included in the performance report message, which will be described in more detail below.

The performance report message may be sent according to an instruction of the MeNB 1112, The MeNB 1112 may establish Radio Resource Control (RRC) connection to the UE 1105, and then may receive performance information of the UE 1105 from an MME. However, in a case that no performance information of the UE 1105 is stored in the MME, the MeNB 1112 may instruct the UE 1105 to report the performance and in response, the UE 1105 may send the performance report message to the MeNB 1112.

In step 1116, the MeNB 1112 sends the UE 1105 an RRC connection reconfiguration message that contains the measurement gap configuration information at an arbitrary point of time. With the control message (RRC connection reconfiguration message), the MeNB 1112 may instruct the UE 1105 to measure other frequencies than the current serving frequency or to measure other Radio Access Technology (RAT). The control message may include measurement-related information and measurement gap configuration information (measurement gap configuration information 1) as shown in Table 1.

TABLE 1

| | |
|---|---|
| Measurement-related information (MeasConfig) | including at least one of measurement object-related information (e.g., measObjectToAddModList), measurement report-related information (e.g., reportConfigToAddModList), and measurement type-related information (e.g., quantityConfig). The measurement object-related information may include information specifying a measurement object, i.e., a frequency to be measured. The measurement report-related information may include information indicating which situation the measurement report message is to be triggered and transmitted for. The measurement type-related information may include information indicating e.g., whether to measure the strength of a downlink signal (Reference Signal Received Power (RSRP)) or whether to measure the quality of the downlink signal (Reference Signal Received Quality (RSRQP)). |
| Measurement gap configuration information 1 | which may be set up for measurement gap establishment/release when DC is not set up in the UE. including at least one of information indicating establishment/release, gapOffset in the case of establishment, information specifying a gap repetition period. |

The UE 1105 uses the information to recognize a time interval corresponding to the measurement gap, and does not receive downlink signals of the serving cell nor transmit uplink signals during the measurement gap. In this case, the UE 1105 may use the 'reference serving cell determination method 1' and 'measurement gap specification method 1' to specify a time interval corresponding to the measurement gap.

In step 1120, UE 1105 applies the measurement gap for currently activated serving cells. More specifically, the UE 1105 may perform 'measurement gap interval operation of a UE in which DC is not set up'.

In step 1121, the MeNB 1112 determines if it is necessary to additionally set up a cell of a SeNB 1110 as a serving cell for the UE 1105. The MeNB 1112 may send a request for setting up a serving cell to the SeNB 1110 in a predetermined control message. The predetermined control message may include various information, and especially, include at least one of rf-Parameters, rf-Parameters-v1020, MeasParameters-v1020, and MeasParameters-v12. The MeNB 1112 may also deliver information relating to SCells currently set up for the UE 1105, i.e., supportedBandCombination information applied for the UE 1105 to the SeNB 1110. The supportedBandCombination information indicates which frequency band the serving cell is set up for in terms of the UE 1105. The MeNB 1112 may also deliver measConfig and MeasGapConfig currently set up for the UE 1105 to the SeNB 1110. MeasConfig is information about measurement set up in the UE 1105, including information about e.g., which frequency the measurement is configured for.

The SeNB 1110 which performs call acceptance control may determine to accept addition of the serving cell in step 1122, and may send the MeNB 1112 a SCELL addition acceptance control message in step 1123. The control message (SCELL addition acceptance control message) may include control information regarding measurement gap configuration.

The SeNB 1110 or MeNB 1112 (hereinafter, collectively called a serving eNB) may operate as follows, in terms of measurement gap configuration. The serving eNB determines whether the measurement gap is required by taking into account the performance of the UE 1105 and a current band combination of the UE 1105 (currently employed supportedBandCombination or a combination of bands where MCG and SCG are configured), and determines a measurement object to be measured, and determines which cell group the measurement gap is to be applied by referring to CellGroupMeasGap. According to the determination, 'measurement gap configuration information 2' is generated and reported to the UE 1105. If the determination is made by the MeNB 1112, the MeNB 1112 may send the 'measurement gap configuration information 2' to the SeNB 1110 for the SeNB 1110 to perform scheduling taking into account the measurement gap. In step 1125, the MeNB 1112 sends the UE 1105 an RRC control message (RRC connection reconfiguration) that contains the generated 'measurement gap configuration information 2'. With the RRC control message, the MeNB 1112 may additionally set up an SCG for the UE 1105 and reconfigure the measurement gap.

In steps 1130, 1135, the UE 1105 performs measurement on the measurement object while performing data transmission and reception with the serving eNB. The UE 1105 may selectively apply the measurement gap for the MCG and SCG serving cells.

If the measurement gap is to be applied for the MCG serving cells, the UE 1105 may specify a measurement gap time interval using at least one of an SFN of the PCell, a sub-frame number of the PCell, the Equation (1), the Equation (2), the reference serving cell determination method 1, and the measurement gap specification method 1, and may perform "MCG measurement gap interval operation of the UE in which DC is set up" for the MCG serving cells during the specified time interval.

If the measurement gap is to be applied to both the MCG and SCG serving cells, the UE 1105 may specify a measurement gap time interval using at least one of an SFN of a certain PCell, a sub-frame number of the PCell, the Equation (1), the Equation (2), the reference serving cell determination method 2, and the measurement gap specification method 2, and may perform "common measurement gap interval operation of the UE in which DC is set up" for all of the serving cells during the specified time interval.

If the measurement gap is to be applied to the SCG serving cells, the UE 1105 may specify a measurement gap time interval using at least one of an SFN of a certain SCG serving cell, e.g., a pSCell, a sub-frame number of the pSCell, the Equation (1), the Equation (2), the reference serving cell determination method 1, and the measurement gap specification method 1, and may perform "SCG measurement gap interval operation of the UE in which DC is set up" for the SCG serving cells during the specified time interval.

The steps for measurement gap interval operation of the UE 1105 are now described.

Measurement Gap Interval Operation of a UE in which DC is not Set Up
    determine a Physical Random Access Channel (PRACH) sub-frame for transmitting a preamble:
        transmit the preamble in the remaining PRACH sub-frames exclusive of PRACH sub-frames that fall on the measurement gap in a case of MAC initiated random access triggered by the UE itself; and
        transmit the preamble in PRACH sub-frames determined based on a point of time when the associated PDCCH is received and information indicated on the PDCCH without considering the measurement gap, in a case of random access indicated by the eNB on the Physical Downlink Control Channel (PDCCH).
    if all or a part of sub-frames in which backward grant (configured uplink grant) is configured is included in the measurement gap:
        process the grant but not transmit a Physical Uplink Shared Channel (PUSCH). The configured backward grant is one assigned in a semi-persistent scheduling scheme, and once assigned, it is a constantly effective transmission resource until explicitly withdrawn. Processing the grant is to enable future retransmission by preparing backward transmission indicated by the grant.
    regarding PDCCH monitoring:
        do not monitor the PDCCH in sub-frames, a part or the entire of which falls on the measurement gap.
    regarding Physical Hybrid-ARQ Indicator Channel (PHICH) reception:
        do not receive the PHICH of an activated serving cell in sub-frames, a part or the entire of which falls on the measurement gap. The PHICH is a forward control channel on which HARQ feedback information is transmitted. If the PUSCH was transmitted but the PHICH has not been received due to the measurement gap, set ACK for the HARQ feedback to prevent unnecessary retransmission.
    regarding Physical Downlink Shared Channel (PDSCH) reception:
        do not receive the PDSCH from an activated serving cell in sub-frames, a part or the entire of which falls on the measurement gap.
    regarding PUSCH transmission:
        do not transmit the PDSCH in sub-frames, a part or the entire of which falls on the measurement gap. Enable retransmission at a next retransmission point of time by setting NACK for the HARQ_FEEDBACK to perform retransmission at the next retransmission point of time.
    regarding Channel-Quality Indicator (CQI)/Channel Status Information (CSI) transmission:
        do not transmit CQI or CSI in sub-frames, a part or all of which falls on the measurement gap.
    regarding SR transmission:
        do not transmit Scheduling Request (SR) in sub-frames, a part or the entire of which falls on the measurement gap.
    regarding SRS transmission:
        do not transmit Sounding Reference Signal (SRS) in a sub-frame in which the last symbol falls on the measurement gap.

MCG Measurement Gap Interval Operation of a UE in which DC is Set Up
    determine PRACH sub-frame for transmission of a preamble:
        transmit the preamble in the remaining PRACH sub-frames exclusive of PRACH sub-frames that fall on the measurement gap in a case of MAC initiated random access in PCell triggered by the UE itself;
        determine PRACH sub-frames to transmit the preamble without consideration of the measurement gap in a case of MAC initiated random access in pSCell triggered by the UE itself; and
        transmit the preamble in PRACH sub-frames determined based on a point of time when the associated PDCCH is received and information indicated on the PDCCH without considering the measurement gap, in a case of random access indicated by the eNB on the PDCCH.

if all or a part of sub-frames in which backward grant (configured uplink grant) is configured is included in the measurement gap:
  process the grant but not transmit a PUSCH. The configured backward grant is one assigned in a semi-persistent scheduling scheme, and once assigned, it is a constantly effective transmission resource until explicitly withdrawn. Processing the grant is to enable future retransmission by preparing backward transmission indicated by the grant.

regarding PDCCH monitoring:
  do not monitor the PDCCH in sub-frames, a part or the entire of which falls on the measurement gap, among sub-frames of the MCG serving cell; and
  monitor the PDCCH without consideration of the measurement gap for activated SCG serving cells, regarding PHICH reception:
  do not receive the PHICH in sub-frames, a part or the entire of which falls on the measurement gap, among sub-frames of the MCG serving cells; and
  receive the PHICH without consideration of the measurement gap for activated SCG serving cells.

regarding PDSCH reception:
  do not receive the PDSCH from the activated serving cells in sub-frames, a part or the entire of which falls on the measurement gap, among sub-frames of the MCG serving cell; and
  receive the PDSCH without consideration of the measurement gap for activated SCG serving cells.

regarding PUSCH transmission:
  do not transmit the PUSCH in sub-frames, a part or the entire of which falls on the measurement gap, among sub-frames of the MCG serving cell. Enable retransmission at a next retransmission point of time by setting NACK for the HARQ_FEEDBACK to perform retransmission at the next retransmission point of time.

regarding CQI/CSI transmission:
  do not transmit CQI or CSI in sub-frames of a PCell, a part or all of which falls on the measurement gap.

regarding SR transmission:
  do not transmit an SR in sub-frames, a part or the entire of which falls on the measurement gap, among sub-frames of the MCG serving cell.

regarding SRS transmission:
  do not transmit an SRS in sub-frames in which the last symbol falls on the measurement gap among the sub-frames of the MCG serving cell.

SCG Measurement Gap Interval Operation of a UE in which DC is Set Up
  determine PRACH sub-frames to transmit a preamble:
    transmit the preamble in the remaining PRACH sub-frames exclusive of PRACH sub-frames that fall on the measurement gap in a case of random access in pSCell triggered by the UE itself;
    determine PRACH sub-frames to transmit the preamble without consideration of the measurement gap in a case of random access in PCell triggered by the UE itself; and
    transmit the preamble in PRACH sub-frames determined based on a point of time when the associated PDCCH is received and information indicated on the PDCCH without considering the measurement gap, in a case of random access indicated by the eNB on the PDCCH.

if all or a part of sub-frames in which backward grant (configured uplink grant) is configured is included in the measurement gap:
  process the grant and transmit a PUSCH without consideration of the measurement gap.

regarding PDCCH monitoring:
  do not monitor the PDCCH in sub-frames, a part or the entire of which falls on the measurement gap, among sub-frames of the SCG serving cell; and
  monitor the PDCCH without consideration of the measurement gap for activated MCG serving cells.

regarding PHICH reception:
  do not receive the PHICH in sub-frames, a part or the entire of which falls on the measurement gap, among sub-frames of the SCG serving cell; and
  receive the PHICH without consideration of the measurement gap for activated MCG serving cells.

regarding PDSCH reception:
  do not receive the PDSCH from the activated serving cells in sub-frames, a part or the entire of which falls on the measurement gap, among sub-frames of the SCG serving cell; and
  receive the PDSCH without consideration of the measurement gap for activated MCG serving cells.

regarding PUSCH transmission:
  do not transmit the PUSCH in sub-frames, a part or the entire of which falls on the measurement gap, among sub-frames of the SCG serving cell. Enable retransmission at a next retransmission point of time by setting NACK for the HARQ_FEEDBACK to perform retransmission at the next retransmission point of time.

regarding CQI/CSI transmission:
  do not transmit CQI or CSI in sub-frames of a pSell, a part or all of which falls on the measurement gap.

regarding SRS transmission:
  do not transmit an SRS in sub-frames in which the last symbol falls on the measurement gap among the sub-frames of the SCG serving cell.

Common Measurement Gap Interval Operation of a UE in which DC is Set Up
  determine PRACH sub-frames to transmit a preamble:
    transmit the preamble in the remaining PRACH sub-frames exclusive of PRACH sub-frames that fall on the measurement gap in a case of MAC initiated random access triggered by the UE itself; and
    transmit the preamble in PRACH sub-frames determined based on a point of time when the associated PDCCH is received and information indicated on the PDCCH without considering the measurement gap, in a case of random access indicated by the eNB on the PDCCH.

if all or a part of sub-frames in which backward grant (configured uplink grant) is configured is included in the measurement gap:
  process the grant but not transmit a PUSCH.

regarding PDCCH monitoring:
  do not monitor the PDCCH in sub-frames, a part or the entire of which falls on the measurement gap.

regarding PHICH reception:
  do not receive the PHICH of an activated serving cell in sub-frames, a part or the entire of which falls on the measurement gap.

regarding PDSCH reception:
do not receive the PDSCH from an activated serving cell in sub-frames, a part or the entire of which falls on the measurement gap.
regarding PUSCH transmission:
do not transmit the PDSCH in sub-frames, a part or the entire of which falls on the measurement gap. Set MACK for HARQ_FEEDBACK to perform retransmission at a next retransmission point of time, and do not transmit HARQ_FEEDBACK in sub-frames, a part or the entire of which falls on the measurement gap.
regarding CQI/CSI transmission:
do not transmit CQI or SCI in sub-frames of a PCell, a part of all of which falls on the measurement gap; and
do not transmit CQI or CSI in sub-frames of a pSCell, a part or the entire of which falls on the measurement gap.
regarding SR transmission:
do not transmit Scheduling Request (SR) in sub-frames, a part or the entire of which falls on the measurement gap.
regarding SRS transmission:
do not transmit Sounding Reference Signal (SRS) in sub-frames where the last symbol falls on the measurement gap.

As described in FIG. 11, the UE 1105 reports to an eNB whether the measurement gap is necessary and a cell group requiring configuration of the measurement gap, and the eNB makes a decision as to whether to configure a measurement gap and a cell group for which the measurement gap is to be configured, based on the report.

Figure 12:
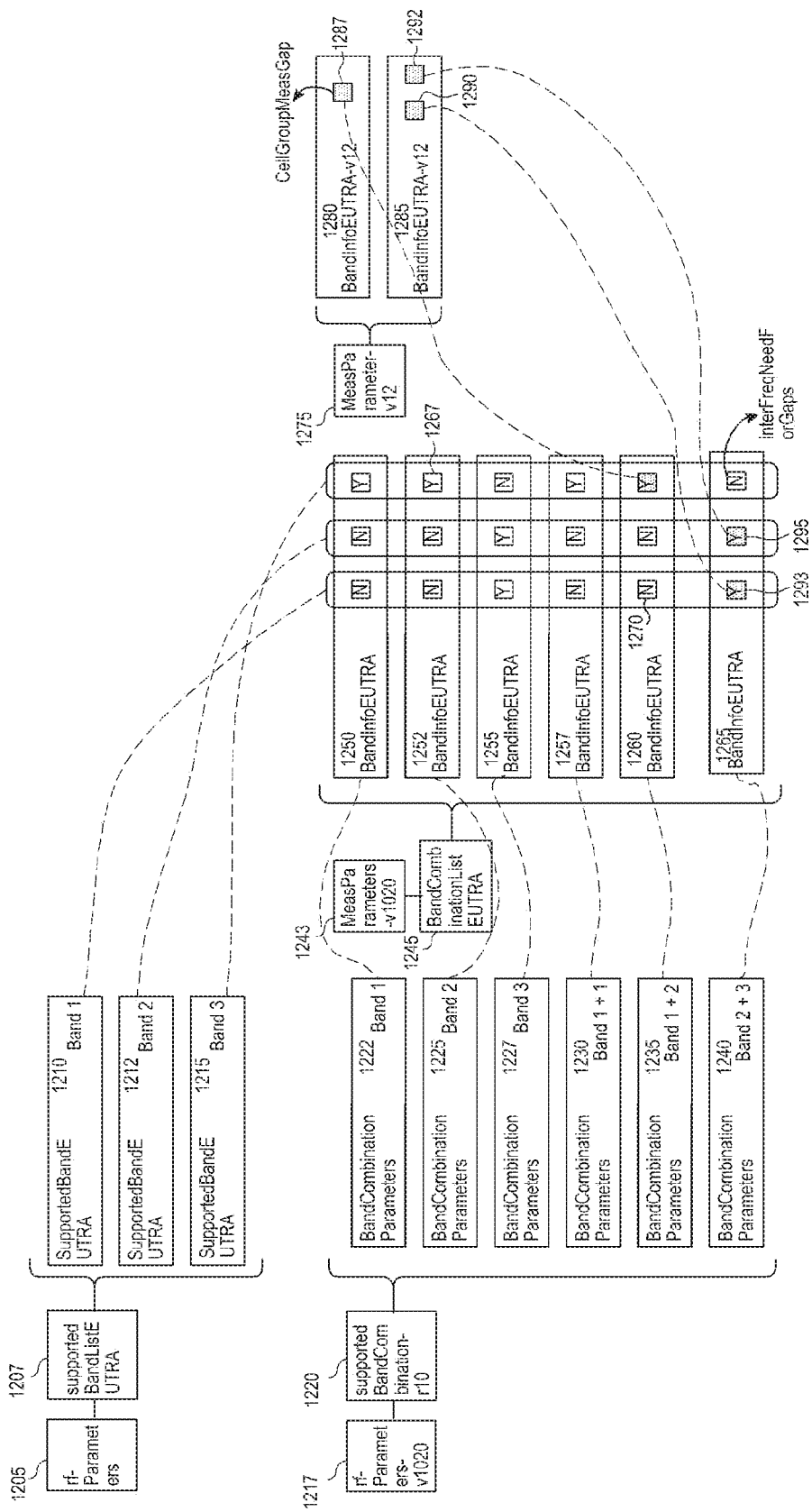
FIG. 12 is a diagram illustrating an example of a performance report message of a UE, according to an embodiment of the present invention.

FIG. 12 is a diagram illustrating an example of a performance report message of a UE, according to an embodiment of the present invention.

Referring to FIG. 12, control information relating to whether the measurement gap is necessary is described.

The performance report message of the UE may include at least one of rf-Parameters 1205, rf-Parameters-v1020 1217, MeasParameters-v1020 1243, and MeasParameters-v12 1275 Information Elements (IEs). The IEs may include sub-IEs.

rf-Parameters 1205 is information for each band the UE supports, and may include an IE and SupportedBandEUTRA 1207 for each band supported. For example, if the UE supports band 1, band 2, and band 3, supportedBandEUTRA for each band may be included 1210-1215.

rf-Parameters-v1020 1217 is an IE related to the UE's carrier aggregation capability. The IE 1217 may include an IE and supportedBandCombination-r10 1220, which is information about a band and band combination that the UE supports. The supportedBandCombination-r10 may include one or more IEs, BandCombinationParameters 1222, 1225, 1227, 1230, 1235, 1240, and the BandCombinationParameters IE may include the number of serving cells that the UE may set up for each band and band combination and information relating to Multiple-Input Multiple-Output (MIMO) performance. For example, if the UE supports band 1, band 2, band 3, a combination of band 1 and band 1 (i.e., intra-band combination), a combination of bands 1 and 2, and a combination of bands 2 and 3, six BandCombinationParameters may be included in a sequence of the single bands 1222, 1225, 1227, the intra-band combination 1230, and inter-band combinations 1235, 1240.

In each BandCombinationParameters, the number of serving cells for each band and MIMO performance information may be included. For example, in BandCombinationParameters 1222 for band 1, information regarding how many serving cells the UE may configure in band 1 and how much the total sum of bandwidth of the configured serving cells is may be included. In BandCombinationParameters 1235, for the combination of bands 1 and 2, how many serving cells and how much bandwidth may be set up for each band may be indicated when the UE configures serving cells in both the bands 1 and 2.

The IE, MeasParameters-v1020 1243 is information indicating requirements related to the measurement gap of the UE and may include an IE and BandCombinationListEUTRA 1245. In the BandCombinationListEUTRA IE 1245, one or more IEs and BandInfoEUTRA 1250, 1252, 1255, 1257, 1260, 1265 may be included.

The BandInfoEUTRA IEs 1250, 1252, 1255, 1257, 1260, 1265 may correspond to the BandCombinationParameters IEs 1222, 1225, 1227, 1230, 1235, 1240. For example, the first BandInfoEUTRA 1250 may correspond to the first BandCombinationParameters 1222, and the second BandInfoEUTRA 1252 may correspond to the second BandCombinationParameters 1225.

Each BandInfoEUTRA may include Boolean information relating to the number of bands the UE supports. The Boolean information is referred to as interFreqneedForGap, which indicates whether the measurement gap is necessary for each band that the UE n supports. If the UE supports band 1, band 2, and band 3, each BandInfoEUTRA may include three interFeqNeedForGap, each indicating whether the measurement gap is necessary for a given 'configuration instance'.

For example, the third interFeqNeedForGap 1267 of the BandInfoEUTRA 1252 for the band 2 indicates whether the measurement gap is necessary in an instance where a measurement object is set up in the band 3 (i.e., measurement on a carrier frequency of the band 3 has to be performed) when the UE sets up a serving cell in the band 2. The first bit (i.e., Boolean information) 1270 of BandInfoEUTRA 1260 corresponding to the combination of bands 1 and 2 indicates whether the measurement gap is necessary in order to measure the measurement object set up in the band 1 when the UE sets up serving cells in bands 1 and 2.

The UE reports whether the measurement gap is necessary to measure a carrier (frequency) of a certain band when a serving cell is set up in a certain band combination, and the respective instances are called 'configuration instances'. The 'configuration instance' is herein represented by [X, Y] for convenience of explanation. [X, Y] refers to an instance where a serving cell is set up in a band combination X and the measurement object is set up for a carrier frequency of band Y. For example, [(1+2), 3] indicates an instance where a serving cell is set up in the combination of bands 1 and 2 and a carrier frequency of band 3 is to be measured.

To sum up, interFeqNeedForGap indicates whether the measurement gap is necessary to perform a measurement when a serving cell is set up in a band combination of BandCombinationParameters corresponding to associated BandInfoEUTRA and a measurement object is set up in the band corresponding to the interFeqNeedForGap.

Using rf-Parameters 1205, rf-Parameters-v1020 1217, and MeasParameters-v1020 1243, the UE may indicate whether the measurement gap is necessary for each meaningful 'configuration instance' in measuring a band of a band combination. In addition to this information, the UE reports whether the cell group measurement gap is applicable if DC is set up, and if it is applicable, which cell group the measurement gap is to be configured for, through an IE, MeasParameter-v12 1275.

The MeasParameter-v12 IE 1275 may include one or more IEs, BandInfoEUTRA-v12 1280, 1285, each in turn including one or more CellGroupMeasGap 1287, 1290, 1292.

The CellGroupMeasGap 1287, 1290, 1292 is information indicating whether the cell group measurement gap is applicable in the corresponding 'configuration instance', and if it is applicable, which serving cell group the measurement gap is to be configured for. The CellGroupMeasGap is not reported in all the configuration instances, but may be reported only in a predetermined condition, for example, in a configuration instance corresponding to an inter-band combination requiring the measurement gap. More specifically, one or more CellGroupMeasGap may be included in a single BandInfoEUTRA-v12. The BandInfoEUTRA-v12 is mapped one to one with BandInfoEUTRA that meets a predetermined condition, and CellGroupMeasGap contained in arbitrary BandInfoEUTRA-v12 is generated only for an interFeqNeedForGap set to 'YES' among interFeqNeedForGaps of the BandInfoEUTRA. The BandInfoEUTRA-v12 may be generated only for a BandInfoEUTRA in which even a single interFeqNeedForGap set to 'YES' is present among BandInfoEUTRAs corresponding to an inter-band combination.

In FIG. 12, BandInfoEUTRA 1260 and 1265, corresponding to an inter-band combination, may include at least one "interFeqNeedForGap=Yes", and a BandInfoEUTRA-v12 may be generated and contained in a control message for each of them.

The first BandInfoEUTRA-v12 1280 may correspond to the BandInfoEUTRA 1260 and the second BandInfoEUTRA-v12 1285 may correspond to the BandInfoEUTRA 1265. In the BandInfoEUTRA-v12, a single CellGroupMeasGap per interFeqNeedForGap denoted as 'Yes' in the corresponding BandInfoEUTRA may be included. For example, in the second BandInfoEUTRA-v12 1285, two CellGroupMeasGap 1290, 1292 (each per the interFeqNeedForGap denoted as 'Yes' in the corresponding BandInfoEUTRA 1265) are contained. The first CellGroupMeasGap 1290 is related to a configuration instance of the first interFeqNeedForGap 1293 denoted as 'Yes', and the second CellGroupMeasGap 1292 is related to a configuration instance of the second interFeqNeedForGap 1295 denoted as 'Yes'. In other words, the MeasParameter-v12 contains a single CellGroupMeasGap per 'configuration instance' requiring the measurement gap in performing measurement by the UE in which CA is set up in an inter-band, and the CellGroupMeasGap contains information indicating which band's serving cell the measurement gap is to be configured for in the 'configuration instance'.

In FIG. 12, the first CellGroupMeasGap 1287 is for a case [(1+2), 3], the second CellGroupMeasGap 1290 is for a case [(2+3), 1], and the third CellGroupMeasGap 1292 is for a case [(2+3), 2].

The CellGroupMeasGap may be information represented simply by 'Yes'/'No', or by integers corresponding to various instances.

Example of CellGroupMeasGap

'Yes': enables configuration of a measurement gap for each cell group in the corresponding configuration instance, and the measurement gap is to be configured for a cell group set up in a band adjacent to a measurement object (or for a serving cell set up in a band adjacent to the measurement object).

'No': disables configuration of a measurement gap for each cell group in, the corresponding configuration instance, and the measurement gap is to be configured for both the MCG and SCG.

For example, if [(1+2), 3] 1287 is 'Yes', it indicates that a measurement gap for measuring a carrier frequency of band 3 may be configured only for a single cell group when serving cells are set up for bands 1 and 2. The cell group (or serving cells) for which the measurement gap is to be configured is a cell group or serving cells configured in a frequency band adjacent to the band 3 (e.g., the frequency band 1 if the distance in the frequency domain between bands 1 and 3 is shorter than the distance between bands 2 and 3).

In another example, if [(2+3), 1] 1290 is No, it indicates that a measurement gap for measuring a carrier frequency of band 1 is to be configured for all the cell groups (or all the serving cells) when serving cells are set up for bands 2 and 3. That is, it indicates that configuration of a cell group measurement gap is disabled.

Table 2 describes another example of CellGroupMeasGap for [($X_1+X_2+ \ldots +X_N$),Y].

TABLE 2

| classification | description |
|---|---|
| 0 | Measurement gap configuration for each cell group is disabled in the corresponding configuration instance. Measurement on band Y is enabled only when the measurement gap is configured both for MCG serving cells and SCG serving cells. |
| 1 | Measurement gap configuration for each cell group is enabled in the corresponding configuration instance. Measurement on band Y is enabled only when the measurement gap is configured for a cell group to which serving cells of the first band (e.g., $X_1$) of current serving bands of the UE belong. For example, if serving cells of $X_1$ and $X_2$ are in the MCG and serving cells of the rest of bands are in the SCG, measurement gap is to be configured for the MCG. |
| 2 | Measurement gap configuration for each cell group is enabled in the corresponding configuration instance. Measurement on band Y is enabled only when the measurement gap is configured for a cell group to which serving cells of the second band (e.g., $X_2$) of current serving bands of the UE belong. |
| ... | |
| N | Measurement gap configuration for each cell group is enabled in the corresponding configuration instance. Measurement on band Y is enabled only when the measurement gap is configured for a cell group to which serving cells of the Nth band (e.g., $X_N$) of current serving bands of the UE belong. |

In step 1116 or 1125 of FIG. 11, measurement gap configuration information 1 and measurement gap configuration information 2 transmitted from the eNB to the UE are briefly described below in table 3.

TABLE 3

| | Description | Contained IE |
|---|---|---|
| Measurement gap configuration information 1 | which is used when only a single cell group is set up in the UE (i.e., when DC is not set up), for configuring a measurement gap to be applied for all | information indicating release (if this information is not included, creation is indicated). gapOffset: specifies a period and starting point of a gap. information indicating release (if this information is not included, creation is indicated). |
| Measurement gap configuration information 2 | | |

TABLE 3-continued

| Description | Contained IE |
| --- | --- |
| the serving cells. which is used when one or more cell groups are set up in the UE (i.e., when DC is set up), for configuring a measurement gap to be applied only to the MCG or the SCG, or configuring a measurement gap to be applied to all the cell groups. | gapOffset: specifies a period and starting point of gap. MCG/SCG indication information: indicates whether the measurement gap is applied to the MCG or the SCG. If this information is not included, the measurement gap is to be applied to all the serving cells. |

Figure 13:
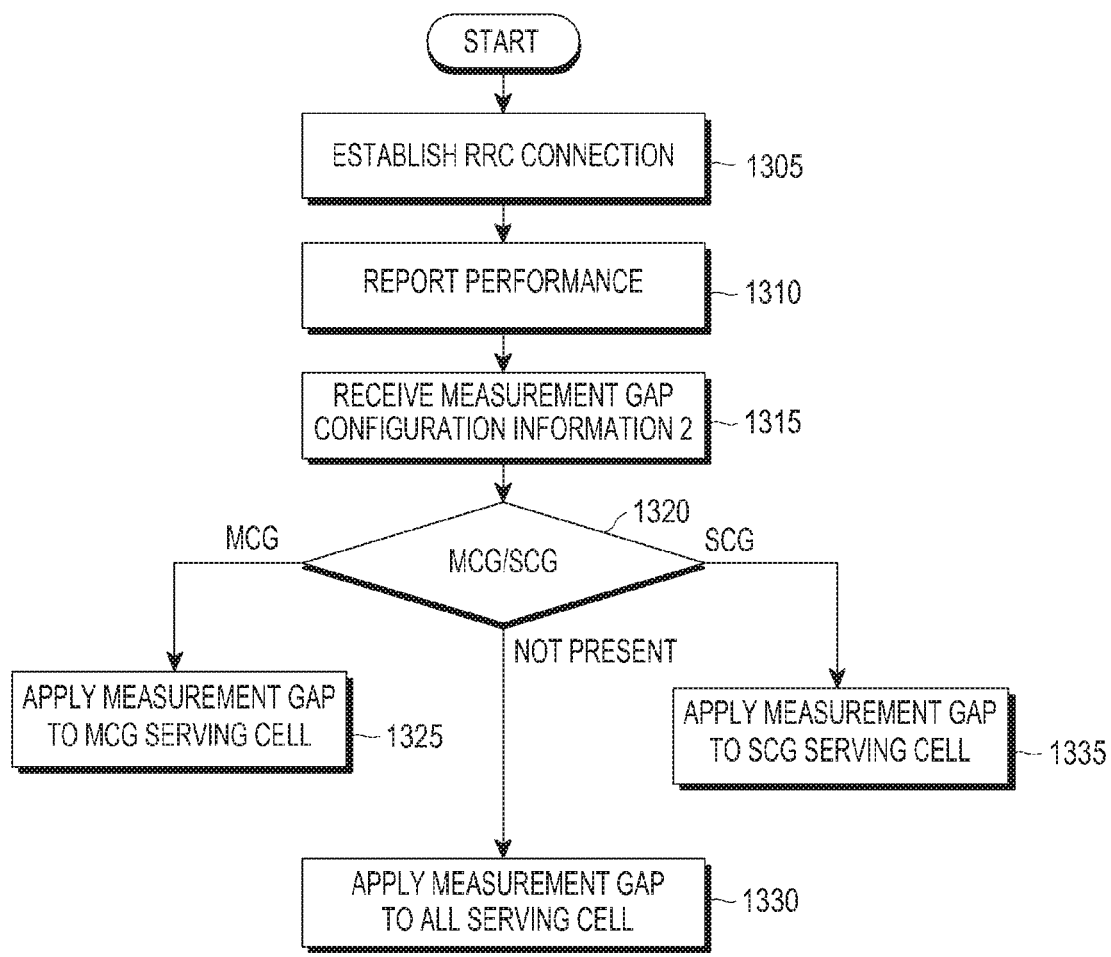
FIG. 13 is a flowchart illustrating a method of a UE for configuring a measurement gap, according to an embodiment of the present invention.

FIG. 13 is a flowchart of a method of a UE for configuring a measurement gap, according to an embodiment of the present invention.

In step 1305, the UE obtains system information of a serving cell to recognize various information required to perform an RRC connection configuration process and initiate the RRC connection configuration process with a serving cell. Once the RRC connection configuration process is completed, the serving cell becomes a PCell of the UE.

In step 1310, the UE reports to the eNB of its performance in a performance information message. The UE creates and sends the performance information message to the eNB, after the eNB sends the UE a control message indicating to report performance for EUTRA. The performance information message may include at least one of information about requirements for a measurement gap and performance information relating to the cell group measurement gap. Information relating to a frequency band combination of the UE may also be included in the performance information message. The eNB determines a configuration of a measurement gap to be applied for the UE by referring to the above information.

In step 1315, at an arbitrary point of time, the UE receives the measurement gap configuration information 2 from the eNB. The UE checks whether the measurement gap configuration information 2 contains MCG/SCG indication information, and if yes, the UE checks whether it indicates MCG or SCG. If the MCG/SCG indication information is not provided, the process proceeds to step 1330, or if the information indicating the MCG is provided, the process proceeds to step 1325, or if the information indicating the SCG is provided, the process proceeds to step 1335.

In step 1325, the UE may apply the measurement gap indicated in the measurement gap configuration information 2 to the MCG serving cells. That is, a reference serving cell is determined from among the MCG serving cells, and a reference sub-frame specifies the measurement gap time interval. Then, for example, data transmission and reception is not performed in the sub-frames of the MCG serving cells that fall on the measurement gap. In other words, the UE determines one of the MCG serving cells to be a reference cell, specifies a measurement gap time interval by applying the 'measurement gap specification method 1', and performs an MCG measurement gap interval operation of the UE in which DC is set up for the MCG serving cells.

In step 1335, the UE may apply the measurement gap indicated in the measurement gap configuration information 2 to the SCG serving cells. That is, a reference serving cell is determined from among the SCG serving cells, and a reference sub-frame specifies the measurement gap time interval. Then, for example, data transmission and reception is not performed in the sub-frames of the SCG serving cells that fall on the measurement gap. In other words, the UE determines one of the SCG serving cells to be a reference cell, specifies and performs an SCG measurement gap interval operation of the UE in which DC is set up for the SCG serving cells.

In step 1330, the UE may apply the measurement gap indicated in the measurement gap configuration information 2 to all the serving cells. In other words, the UE determines one of the MCG serving cells to be a reference cell, specifies a measurement gap time interval by applying the 'measurement gap specification method 2', and performs common measurement gap interval operation of the UE in which DC is set up for the serving cells.

Figure 14:
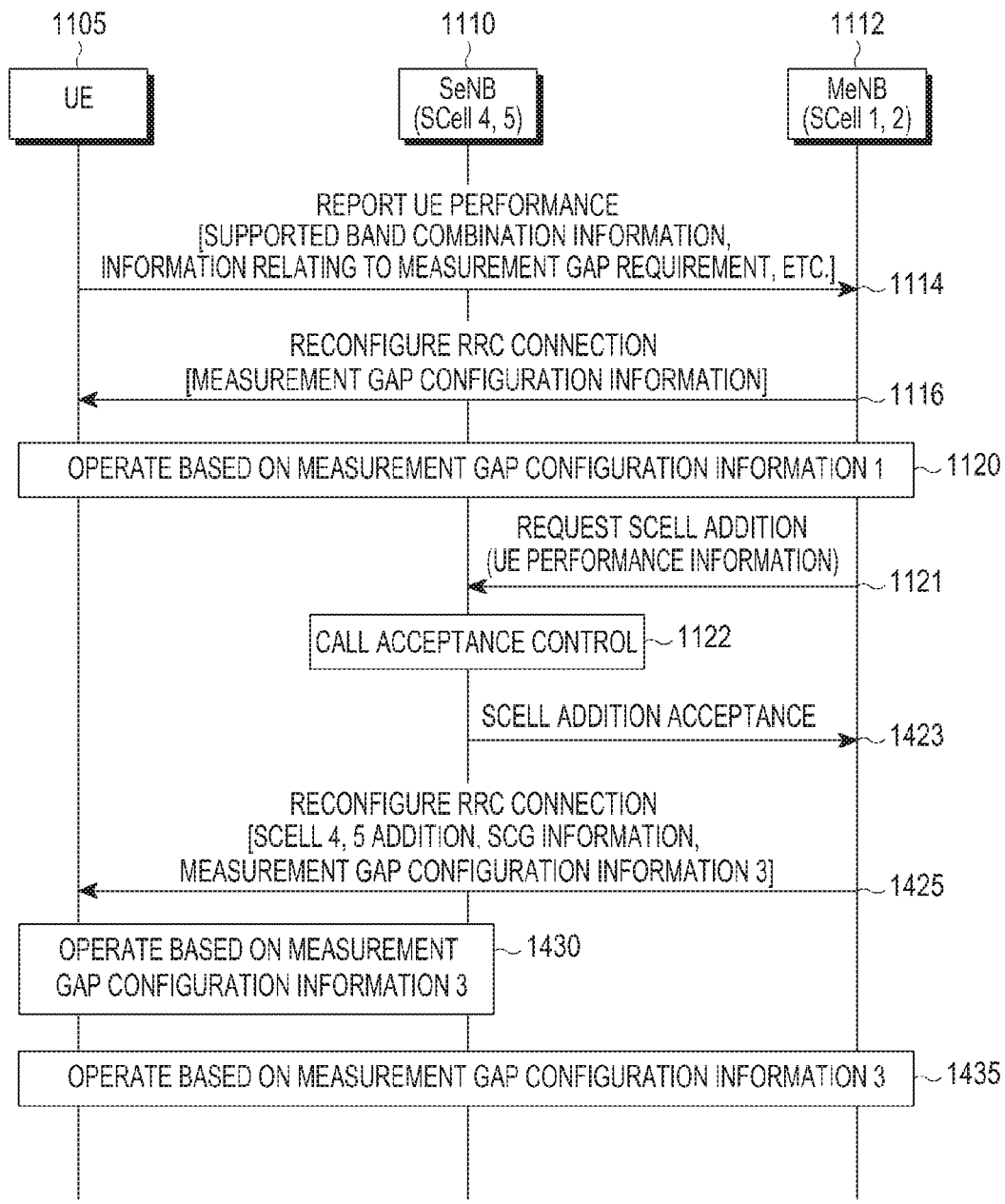
FIG. 14 is a signaling diagram illustrating a method of a UE and eNBs, according to an embodiment of the present invention.

FIG. 14 is a signaling diagram illustrating a method of a UE and eNBs, according to an embodiment of the present invention.

A description of steps 1114-1122, which were described above, are omitted herein.

In step 1423, the SeNB 1110 sends the MeNB 1112 an SCELL addition acceptance control message. The control message (SCELL addition acceptance control message) may include control information regarding measurement gap configuration.

The SeNB 1110 or MeNB 1112 (hereinafter, collectively called a serving eNB) may operate as follows, in terms of the measurement gap configuration. The serving eNB determines whether the measurement gap is required by taking into account the performance of the UE 1105 and a current band combination of the UE (currently employed supportedBandCombination or a combination of bands where MCG and SCG are configured), and a measurement object to be measured, and determines which band the measurement gap is to be applied by referring to CellGroupMeasGap. According to the determination, the 'measurement gap configuration information 3' is generated and reported to the UE. If the determination is made by the MeNB 1112, the MeNB 1112 may send the 'measurement gap configuration information 3' to the SeNB 1110 for the SeNB 1110 to perform scheduling taking into account the measurement gap. In step 1425, the MeNB 1112 sends to the UE an RRC control message (RRC connection reconfiguration) that contains the generated 'measurement gap configuration information 3'. With the RRC control message, the MeNB 1112 may additionally configure an SCG for the UE and reconfigure the measurement gap.

In step 1430, the UE 1105 performs measurement on the measurement object while performing data transmission and reception with the serving eNB. The UE selectively applies the measurement gap for each band. For example, if the measurement gap is configured for arbitrary band x, the UE may determine one of the serving cells set up in the band x to be a reference serving cell, and specifies a reference sub-frame using at least one of the Equations (1) and (2). After specifying the measurement gap time interval, data transmission and reception may not be performed in sub-frames, even a part of which falls on the measurement gap, among the sub-frames of the serving cells set up in the band x.

If the band for which the measurement gap is indicated is a band of the MCG serving cells, the UE may specify a measurement gap time interval using at least one of an SFN of a PCell, a sub-frame number of the PCell, the Equations (1) and (2), the 'reference serving cell determination method 1' and the 'measurement gap specification method 1'.

If the band for which the measurement gap is indicated is a band of SCG serving cells, the UE may specify a measurement gap time interval using at least one of an SFN of a pSCell, a sub-frame number of the pSCell, the Equations (1) and (2), the 'reference serving cell determination method 1' and the 'measurement gap specification method 1'.

Measurement gap configuration information 3 may be in the following Table 4.

TABLE 4

|  | Description | Contained IE |
| --- | --- | --- |
| Measurement gap configuration information 3 | used when the UE may apply a measurement gap for each band. Configure a measurement gap to be applied only to serving cells of a particular band. | information indicating release (if this information is not included, creation is indicated). gapOffset: specifies a period and starting point of gap. information indicating a measurement gap band: indicates which band the measurement gap is to be applied for. |

The information indicating a measurement gap band may be represented by an integer, and the maximum value is the number of bands the UE supports. Taking for example FIG. 12, the maximum value of the information indicating a measurement gap band is 3 and has the same meaning as in Table 5.

TABLE 5

| classification | Description |
| --- | --- |
| 0 | Measurement gap per band is not configured, and the measurement gap is applied to all serving cells. |
| 1 | Configure a measurement gap per band. Apply a measurement gap to a serving cell set up in the first SupportedBandEUTRA of the SupportedBandListEUTRA. Alternatively, apply a measurement gap to the first band (or a band having the lowest identifier) in the current band combination of the UE. |
| 2 | Configure a measurement gap per band. Apply a measurement gap to a band (or a serving cell of the band) indicated in the second SupportedBandEUTRA of the SupportedBandListEUTRA. Alternatively, apply a measurement gap to the second band (or a band having the second-lowest identifier) in the current band combination set up in the UE. |
| ... | |
| N | Configure a measurement gap per band. Apply a measurement gap to a band (or a serving cell of the band) indicated in the N'th SupportedBandEUTRA of the SupportedBandListEUTRA. Alternatively, apply a measurement gap to the N'th band (or a band having the second-lowest identifier) in the current band combination set up in the UE. |

Figure 15:
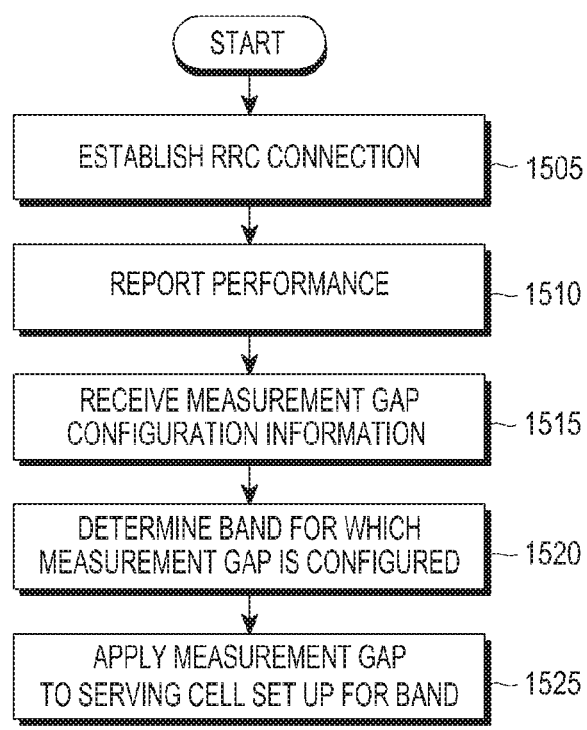
FIG. 15 is a flowchart illustrating a method of a UE for configuring a measurement gap, according to an embodiment of the present invention.

FIG. 15 is a flowchart illustrating a method of a UE for configuring a measurement gap, according to an embodiment of the present invention.

Step 1505 may be the same as the step 1305 described above.

Step 1510 may be the same as the step 1310 described above.

In step 1515, the UE receives the 'measurement gap configuration information 3' from the eNB.

In step 1520, the UE determines a band for which a measurement gap is configured, using the information indicating the measurement gap band of the 'measurement gap configuration information 3'.

In step 1525, the UE applies the measurement gap to the serving cells set up for the band. In this case, after a reference serving cell and a reference sub-frame are determined and a measurement gap ti m interval is specified based on a predetermined rule, transmission and reception for the serving cells is not performed in sub-frames, a part or all of which falls on the measurement gap time interval, among sub-frames of the serving cells set up for the band.

A method of sending CSI and SRS by the UE in which DC and Discontinuous Reception (DRX) are set up is provided.

The UE where the DRX is being performed performs CSI and SRS transmission only for Active Time or onDuration, thereby preventing unnecessary battery consumption. Furthermore, if the DC is set up, the DRX is separately set up for the MCG and SCG, and the UE determines whether to transmit by taking into account a DRX condition of a cell group in which CSI or SRS transmission is to be performed.

As used herein, Active Time is a time defined for the UE that is performing DRX to monitor the PDCCH, a scheduling channel (see 3GPP standards 36.211, 212, 213). The Active Time may be created or extended according to various events. For example, upon reception of a PDCCH that indicates first transmission in the MCG serving cell, Active Time of the MCG is extended by a set length; and upon reception of a PDCCH that indicates first transmission in the SCG serving cell, Active Time of the SCG is extended by a set length. Other related matters follow the 3GPP standard 36.321.

As used herein, onDuration is a time interval created periodically; the UE that is performing DRX has to monitor the PDCCH during at least the onDuration in every DRX cycle. The onDuration is operated independently for each cell group. For example, the UE monitors the PDCCH of MCG serving cells at predetermined intervals specified by, for example, a predetermined DRX cycle, and monitors the PDCCH of SCG serving cells at different predetermined intervals specified by, for example, another predetermined DRX cycle. Other related matters follow the 3GPP standard 36.321.

As used herein, CQI-mask is a parameter to control whether to restrict the CSI transmission only to the onDuration. If the CQI-mask is set up, the UE determines whether to perform CSI transmission based on a predetermined rule. Other related matters follow the 3GPP standard 36.321.

As used herein, CSI on a PUCCH refers to Channel State Information/Indication (CSI) transmitted on the PUCCH. The CSI is periodically transmitted on a PUCCH transmission resource of a PCell or pSCell. Other related matters follow the 3GPP standards 36.211, 36.212, 36.213.

As used herein, CSI on PUSCH refers to CSI transmitted on the PUSCH. If PUSCH transmission is scheduled in sub-frames in which the CSI on PUCCH is to be transmitted, in a serving cell of the same cell group, the UE devotes part of PUSCH transmission resources to transmit CSI and skips transmission of the CSI on PUCCH. Other related matters follow the 3GPP standards 36.211, 36.212, 36.213.

Figure 16A:
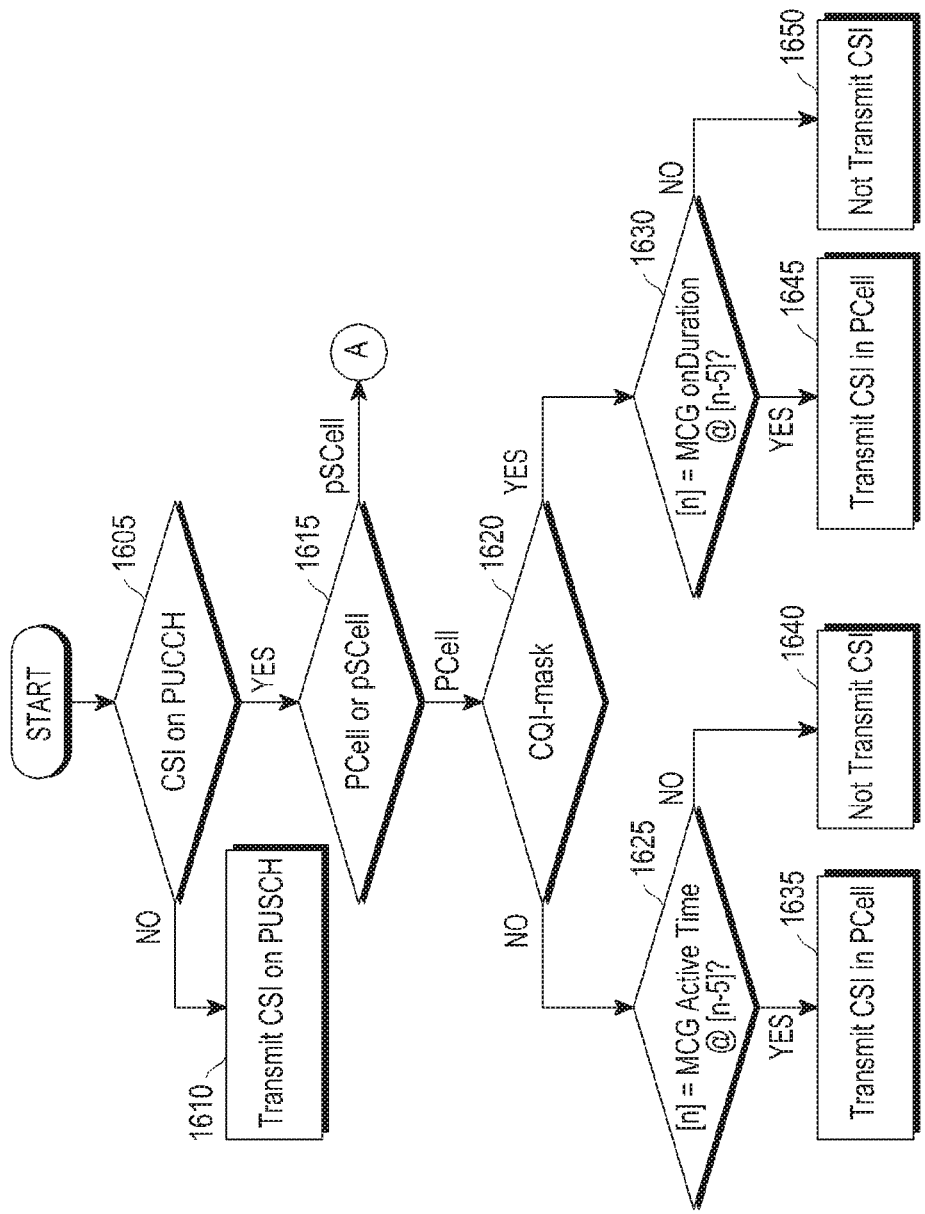
FIGS. 16A and 16B are flowcharts illustrating a method of a UE for determining whether to transmit CSI in sub-frame n, according to an embodiment of the present invention.
Figure 16B:
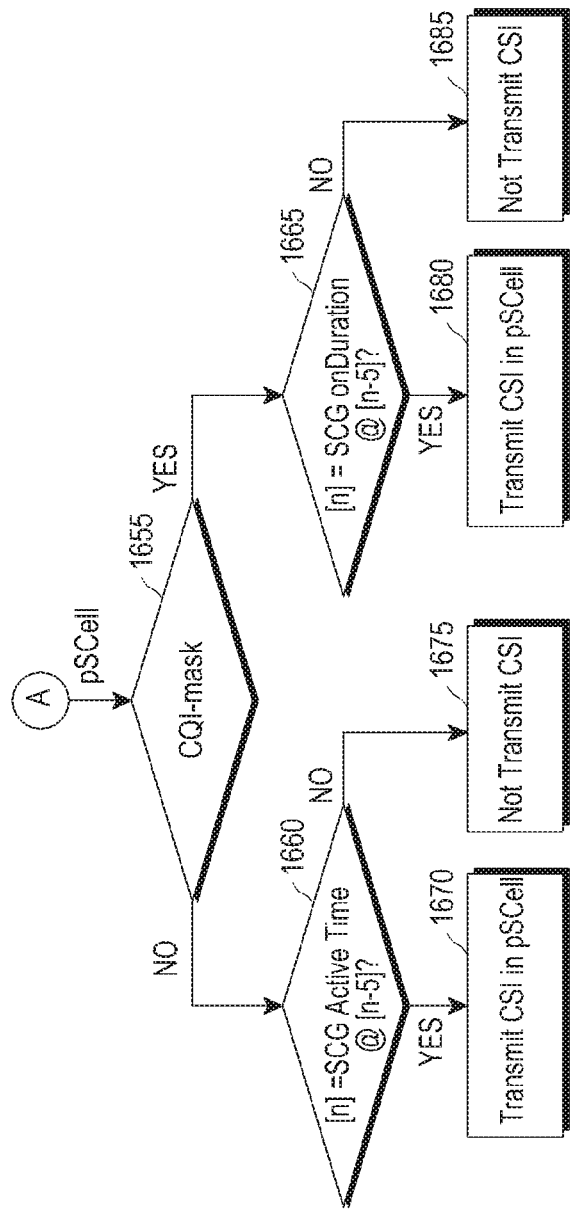

FIGS. 16A and 16B are flowcharts illustrating a method of determining whether to transmit CSI by a UE to which CSI transmission resources are allocated in a sub-frame [n] of a PCell or pSCell, according to an embodiment of the present invention.

In step 1605, the UE checks if the CSI transmission is on a PUCCH or a PUSCH. If the CSI is on the PUCCH, the operation proceeds to step 1615, or if the CSI is on the PUSCH, the operation proceeds to step 1610.

In step 1610, the UE performs the CSI on the PUSCH in the sub-frame [n] and skips the CSI on the PUCCH transmission.

In step 1615, the UE checks whether the CSI on PUCCH is for a PCell or pSCell, and if the CSI transmission on the PUCCH is for the PCell, the operation proceeds to step 1620, or if the CSI transmission on the PUCCH is for the pSCell, the operation proceeds to step 1655.

In step 1620, the UE checks whether CQI-mask is set up in the MCG (or whether CQI-mask is set up in an MAC entity that controls the MCG operation), and if it is set up, the operation proceeds to step 1630, or if it is not set up, the operation proceeds to step 1625.

In step 1625, if the UE determines from the sub-frame [n−5] of the MCG (i.e., determines by taking into account uplink scheduling information/downlink scheduling information/DRX command MAC Control Entity (CE), etc., received in the MCG until the sub-frame [n−5]) that the MCG sub-frame [n] is Active Time (even though, actually, it is not Active Time), the UE proceeds to step 1635 to transmit CSI using the PUCCH of the PCell.

In step 1625, if the UE determines from the MCG sub-frame [n−5] that the sub-frame [n] is not Active Time (even though, actually, it is Active Time), the UE proceeds step 1640 to skip the CSI on PUCCH transmission in the PCell.

As described above, determining whether to perform CSI transmission by only taking into account situations before 5 sub-frames is necessary because it may be difficult for the UE to determine whether it is Active time in real time.

In step 1630, if the UE determines from the sub-frame [n−5] of the MCG (i.e., determines by taking into account uplink scheduling information/downlink scheduling information/DRX command MAC CE, etc., received in the MCG until the sub-frame [n−5]) that the MCG sub-frame [n] is onDuration (even though, actually, it is not onDuration), the UE proceeds to step 1645 to transmit CSI using the PUCCH of the PCell.

In step 1630, if the UE determines from the MCG sub-frame [n−5] that the sub-frame [n] is not onDuration (even though, actually, it is onDuration), the UE proceeds step 1650 to skip the CSI on PUCCH transmission in the PCell.

In step 1655, the UE checks whether CQI-mask is set up in the SCG (or whether CQI-mask is set up in an MAC entity that controls the SCG operation), and if it is set up, the operation proceeds to step 1665, or if it is not set up, the operation proceeds to step 1660.

In step 1660, if the UE determines from the sub-frame [n−5] of the SCG (i.e., determines by taking into account uplink scheduling information/downlink scheduling information/DRX command MAC CE, etc., received in the SCG until the sub-frame [n−5]) that the SCG sub-frame [n] is Active Time (even though, actually, it is not Active Time), the UE proceeds to step 1670 to transmit CSI using the PUCCH of the pSCell.

In step 1660, if the UE determines from the SCG sub-frame [n−5] that the sub-frame [n] is not Active Time (even though, actually, it is Active Time), the UE proceeds step 1675 to skip the CSI on PUCCH transmission in the pSCell.

In step 1665, if the UE determines from the sub-frame [n−5] of the SCG (i.e., determines by taking into account uplink scheduling information/downlink scheduling information/DRX command MAC CE, etc., received in the SCG until the sub-frame [n−5]) that the SCG sub-frame [n] is onDuration (even though, actually, it is not onDuration), the UE proceeds to step 1680 to transmit CSI using the PUCCH of the pSCell.

In step 1665, if the UE determines from the SCG sub-frame [n−5] that the sub-frame [n] is not onDuration (even though, actually, it is onDuration), the UE proceeds step 1685 to skip the CSI on PUCCH transmission in the pSCell.

Figure 17:
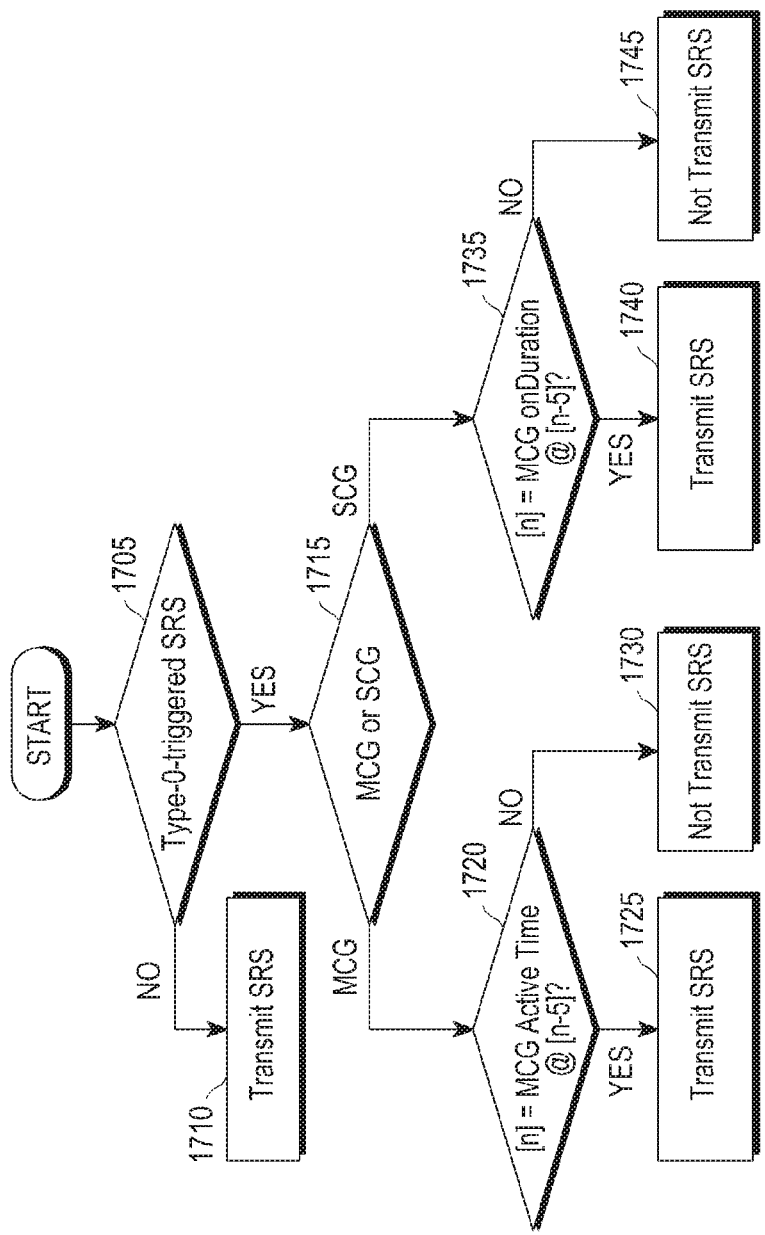
FIG. 17 is a flowchart illustrating a method of a UE for determining whether to transmit SRS in sub-frame n, according to an embodiment of the present invention.

FIG. 17 is a flowchart illustrating a method of determining whether to transmit SRS by a UE to which SRS transmission resources are allocated in a sub-frame [n] of an MCG or an SCG, according to an embodiment of the present invention.

SRS transmission may be divided by type-0-triggered SRS and type-1-triggered SRS. Type-0-triggered SRS is an SRS that occurs periodically, and an SRS transmission resource pre-allocated to the UE is used in a connection establishment process. Type-1-triggered SRS is an SRS that occurs non-periodically based on indications of the eNB, and the eNB indicates the type-1-triggered SRS transmission by setting a particular field of the PDCCH to a predetermined value.

Other related matters regarding the type-0-triggered SRS and type-1-triggered SRS follow the 3GPP standards 36.211, 36.212, 36.213, 36.321.

In step 1705, the UE determines whether the SRS transmission is a type-0-triggered SRS, and if it is the type-0-triggered SRS, the UE proceeds to step 1715, and if it is the type-1-triggered SRS, the UE proceeds to step 1710 to transmit SRS.

In step 1715, the UE checks whether the type-0-triggered SRS relates to an MCG serving cell or relates to an SCG serving cell, and if the type-0-triggered SRS relates to the MCG serving cell, the UE proceeds to step 1720, and if the type-0-triggered SRS relates to the SCG serving cell, the UE proceeds to step 1735.

In step 1720, if the UE determines from the sub-frame [n−5] of the MCG (i.e., determines by taking into account uplink scheduling information/downlink scheduling information/DRX command MAC CE, etc., received in the MCG until the sub-frame [n−5]) that the MCG sub-frame [n] is Active Time (even though, actually, it is not Active Time), the UE proceeds to step 1725 to transmit SRS in the MCG serving cell.

In step 1720, if the UE determines from the MCG sub-frame [n−5] that the sub-frame [n] is not Active Time (even though, actually, it is Active Time), the UE proceeds step 1730 and does not transmit SRS in the MCG serving cell.

In step 1735, if the UE determines from the sub-frame [n−5] of the SCG determines by taking into account uplink scheduling information/downlink scheduling information/DRX command MAC CE, etc., received in the SCG until the sub-frame [n−5]) that the SCG sub-frame [n] is Active Time (even though, actually, it is not Active Time), the UE proceeds to step 1740 to transmit SRS in the SCG serving cell.

In step 1735, if the UE determines from the SCG sub-frame [n−5] that the sub-frame [n] is not Active Time (even though, actually, it is Active Time), the UE proceeds step 1745 and does not transmit SRS in the SCG serving cell.

Figure 18:
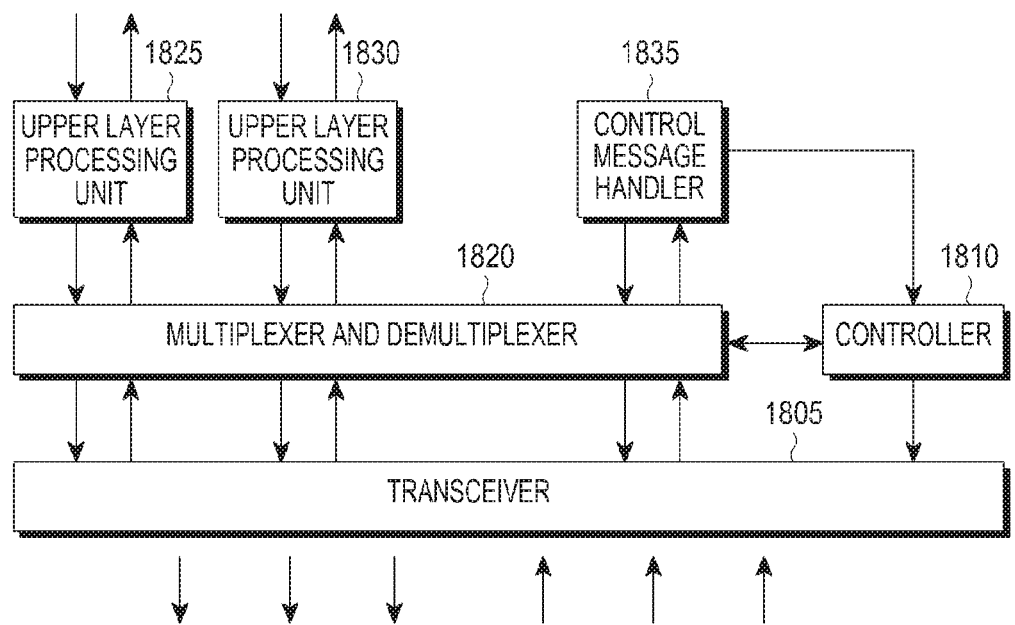
FIG. 18 is a diagram of a UE, according to an embodiment of the present invention.

FIG. 18 is a diagram of a UE, according to an embodiment of the present invention.

Referring to FIG. 18, the UE includes at least one of a transceiver 1805, a controller 1810, a multiplexer and demultiplexer 1820, a control message handler 1835, and various upper layer processing units 1820, 1825.

The multiplexer and demultiplexer 1820 and the controller 1810 may constitute an MAC device, and although not distinguished in FIG. 18 for convenience, the MAC devices for MCG and SCG may be separately configured when DC has been set up.

The transceiver 1805 receives data and certain control signals on a forward channel of a serving cell and transmits data and certain control signals on a backward channel. If multiple serving cells are set up, the transceiver 1805 performs data transmission and reception and control signal transmission and reception through the multiple serving cells. The transceiver 1805 may include one or more RF circuits/front ends, and an operating frequency of the RF circuit/front end may be set up under control of the controller 1810. The transceiver 1805 performs inter-frequency measurement at a certain point of time, receives signals from a current serving cell at a certain point of time, and/or transmits signals to the serving cell, under control of the controller 1810.

The multiplexer and demultiplexer 1820 is configured to multiplex data generated in the upper layer processing units 1830, 1825 or the control message handler 1835, or demultiplex data received from the transceiver 1805, and deliver the multiplexing or demultiplexing result to the upper layer processing units 1830, 1825 or the control message handler 1835.

The control message handler 1835 is an RRC layer device for processing a control message received from the eNB. For example, the control message handler 1835 may receive an RRC control message and deliver measurement gap-related information, DRX information, etc., to the controller 1810.

The upper layer processing units 1830, 1825 may process data generated in user services, such as File Transfer Protocol (FTP) or Voice over Internet Protocol (VoIP) and deliver the result to the multiplexer and demultiplexer 1820, or process data delivered from the multiplexer and demultiplexer 1820 and deliver the result to an upper layer service application.

The controller 1810 checks a scheduling command, e.g., an uplink grant, a downlink assignment, etc., received through the transceiver 1805, and controls the transceiver 1805 and multiplexer and demultiplexer 1820 to perform uplink transmission or downlink reception on a proper transmission resource at a suitable point of time. The controller 1810 may also coordinate a general procedure related to SCell configuration of the UE, a general procedure related to a measurement gap, a general DRX-related procedure, etc. That is, the controller 1810 may control UE operations among operations as described in FIGS. 3-17.

Figure 19:
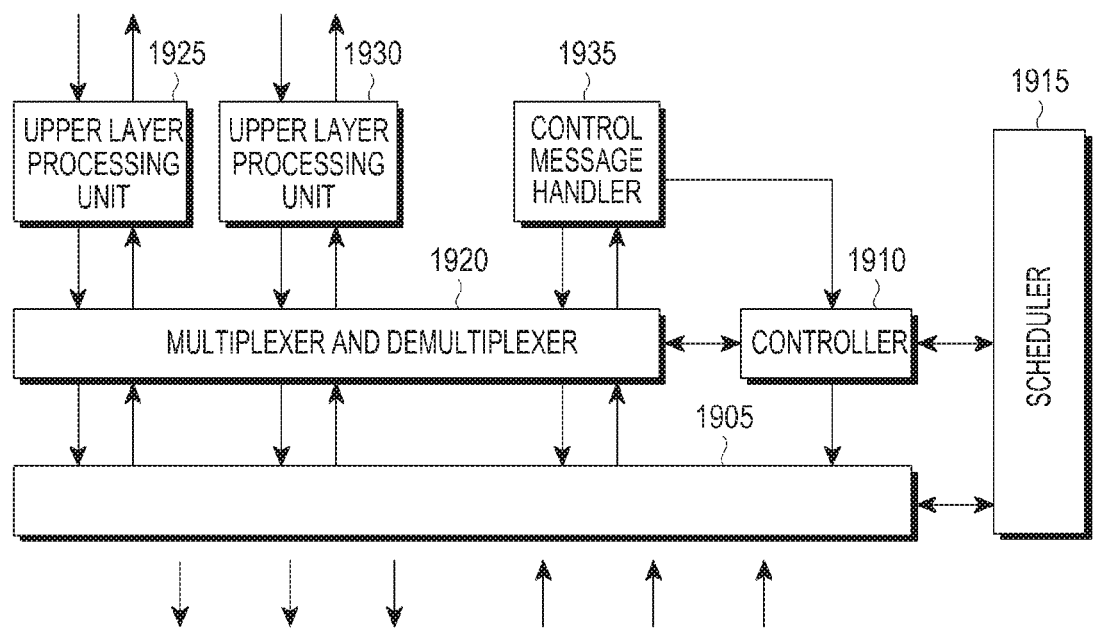
FIG. 19 is a diagram of an eNB, according to an embodiment of the present invention.

FIG. 19 is a diagram of an eNB, according to an embodiment of the present invention.

The eNB includes at least one of a transceiver 1905, a controller 1910, a multiplexer and demultiplexer 1920, a control message handler 1935, various upper layer processing units 1925, 1930, and a scheduler 1915.

The transceiver 1905 transmits data and certain control signals on a forward carrier and receives data and certain control signals on a backward carrier. If multiple carriers are set up, the transceiver 1905 performs data transmission and reception and control signal transmission and reception with the multiple carriers.

The multiplexer and demultiplexer 1920 is configured to multiplex data generated in the upper layer processing units 1925, 1930 or the control message handler 1935 or demultiplex data received from the transceiver 1905, and deliver the multiplexing or demultiplexing result to the upper layer processing units 1925, 1930, the control message handler 1935, or the controller 1910.

The control message handler 1935 processes a control message transmitted from the UE and/or generates a control message to be delivered to the UE and deliver the control message to a lower layer.

The upper layer processing units 1925, 1930 may be configured for each bearer, and configure data delivered from an S-GW or another eNB into RLC PDUs and deliver them to the multiplexer and demultiplexer 1920, or configure RLC PDUs delivered from the multiplexer and demultiplexer 1920 into PDCP SDUs and deliver them to an S-GW or another eNB.

The scheduler 1915 allocates transmission resources to the UE at a proper point of time by taking into account a buffer status of the UE, a channel condition, etc., and controls the transceiver 1905 to process signals transmitted from the UE or transmit signals to the UE.

The controller 1910 may also coordinate the general procedure related to SCell configuration, the general procedure related to measurement gap configuration, the general DRX-related procedure, etc. That is, it may control eNB operations among operations as described in FIGS. 3-17.

It is noted that the layer block diagrams, illustrations of UE methods, operational flowcharts between UE and eNB, block diagram of the UE, block diagram of the eNB as shown in FIGS. 2, 8, 10, 11, 13-19 do not intend to restrict the scope of the present invention. That is, all the components or operational steps as shown in FIGS. 2, 8, 10, 11, 13-19 should not be interpreted as essential elements for implementing embodiments of the present invention, as one or more of the components or operational steps described with reference to these FIGS. can be omitted.

The foregoing operations may be implemented by program codes stored in a storage equipped in a component (e.g., a controller) of the eNB or the UE. In other words, the controller of the eNB or UE may perform the foregoing operations by reading and executing the program codes with a processor or the Central Processing Unit (CPU).

Various components and modules of the eNB or UE as described in the present disclosure may be implemented in hardware, such as Complementary Metal Oxide Semiconductor (CMOS)-based logic circuits, firmware, software, or a combination thereof. For example, various electronic structures and methods may be practiced using electrical circuits, such as transistors, logic gates, and Application Specific Integrated Circuits (ASICs). The components and modules described with respect to the eNB or UE and used to carry out the methods described herein may be implemented on a System on Chip (SoC).

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

The invention claimed is:

1. A method for performing a measurement procedure by a user equipment (UE) in a wireless communication system supporting a dual connectivity (DC), the method comprising:

receiving control information including measurement gap configuration information indicating gap configuration for at least one operating frequency band to which a measurement gap is applied;

obtaining a system frame number (SFN) of a serving cell and a sub-frame of the serving cell based on the measurement gap configuration information;

determining a first sub-frame of the measurement gap based on the SFN and the sub-frame; and performing a measurement on at least one serving cell including the serving cell at the first sub-frame, wherein the measurement gap starts at an ending point of a sub-frame that ends last among sub-frames that occur immediately before the measurement gap.

2. The method of claim 1, wherein the measurement gap is applied to a first operating frequency band in case that the measurement gap configuration information indicates a first gap configuration;

the measurement gap is applied to a second operating frequency band in case that the measurement gap configuration information indicates a second gap configuration; and the measurement gap is applied to all of the first and second operating frequency bands in case that the measurement gap configuration information indicates a third gap configuration.

3. The method of claim 2, wherein the first operating frequency band is associated with a master cell group (MCG), and the second operating frequency band is associated with a secondary cell group (SCG).

4. The method of claim 3, wherein the serving cell is a primary cell (Pcell) of the MCG or a primary secondary cell (PScell) of the SCG.

5. The method of claim 3, wherein the measurement gap configuration information indicating the first gap configuration is determined by a first base station which is associated with the MCG and transmitted by the first base station to the UE, and wherein the measurement gap configuration information indicating the second gap configuration is determined by a second base station which is associated with the SCG and transmitted by the first base station to the UE.

6. The method of claim 2, wherein a downlink signal is not received on an operating frequency band of the at least one serving cell during a measurement gap corresponding to the indicated gap configuration.

7. A user equipment (UE) for performing a measurement procedure in a wireless communication system supporting a dual connectivity (DC), the UE comprising:

a transceiver; and a controller configured to control the transceiver, wherein the controller is configured to:

receive control information including measurement gap configuration information indicating gap configuration for at least one operating frequency band to which a measurement gap is applied, obtain a system frame number (SFN) of a serving cell and a sub-frame of the serving cell based on the measurement gap configuration information, determine a first sub-frame of the measurement gap based on the system frame number (SFN) and the sub-frame, and perform a measurement on at least one serving cell including the serving cell at the first sub-frame, wherein the measurement gap starts at an ending point of a sub-frame that ends last among sub-frames that occur immediately before the measurement gap.

8. The UE of claim 7, wherein the controller is configured to apply the measurement gap to a first operating frequency band in case that the measurement gap configuration information indicates a first gap configuration;

the controller is configured to apply the measurement gap to a second operating frequency band in case that the measurement gap configuration information indicates a second gap configuration; and the controller is configured to apply the measurement gap to the first and second operating frequency bands in case that the measurement gap configuration information indicates a third gap configuration.

9. The UE of claim 8, wherein the first operating frequency is associated with a master cell group (MCG), and the second operating frequency band is associated with a secondary cell group (SCG).

10. The UE of claim 9, wherein the serving cell is the primary cell (Pcell) of the MCG or a primary secondary cell (PScell) of the SCG.

11. The UE of claim 8, wherein the controller is configured not to receive a downlink signal on an operating frequency band of the at least one serving cell during a measurement gap corresponding to the indicated gap configuration.

12. The UE of claim 9, wherein the measurement gap configuration information indicating the first gap configuration is determined by a first base station which is associated with the MCG and transmitted by the first base station to the UE, and wherein the measurement gap configuration information indicating the second gap configuration is determined by a second base station which is associated with the SCG and transmitted by the first base station to the UE.

13. A method for performing a measurement procedure by a base station in a wireless communication system supporting dual connectivity (DC), the method comprising:

transmitting control information including measurement gap configuration information indicating gap configuration for at least one operating frequency band to which a measurement gap is applied, wherein a system frame number (SFN) of a serving cell and a sub-frame of the serving cell is obtained based on the measurement gap configuration information, wherein a first sub-frame of a measurement gap is determined based on the SFN and the sub-frame, and wherein the measurement gap is performed on at least one serving cell including the serving cell at the first sub-frame, wherein the measurement gap starts at an ending point of a sub-frame that ends last among sub-frames that occur immediately before the measurement gap.

14. The method of claim 13, wherein the measurement gap is applied to a first operating frequency band in case that the measurement gap configuration information indicates a first gap configuration;

the measurement gap is applied to a second operating frequency band in case that the measurement gap configuration information indicates a second gap configuration; and the measurement gap is applied to all of the first and second operating frequency bands in case that the measurement gap configuration information indicates a third gap configuration.

15. The method of claim 14, wherein the first operating frequency band is associated with a master cell group (MCG), and the second operating frequency band is associated with a secondary cell group (SCG).

16. The method of claim 15, wherein the serving cell is a primary cell (Pcell) of the MCG or a primary secondary cell (PScell) of the SCG.

17. The method of claim 15, wherein the measurement gap configuration information indicating the first gap configuration is determined by the base station which is associated with the MCG and transmitted by the base station to a user equipment (UE), and wherein the measurement gap configuration information indicating the second gap configuration is determined by another base station which is associated with the SCG and transmitted by the base station to the UE.

18. The method of claim 14, wherein a downlink signal is not transmitted on an operating frequency band of the at least one serving cell during a measurement gap corresponding to the indicated gap configuration.

19. A base station for performing a measurement procedure in a wireless communication system supporting dual connectivity (DC), the base station comprising:
a transceiver; and
a controller configured to control the transceiver, wherein the controller is configured to:
transmit control information including measurement gap configuration information indicating gap configuration for at least one operating frequency band to which a measurement gap is applied,
wherein a system frame number (SFN) of a serving cell and a sub-frame of the serving cell is obtained based on the measurement gap configuration information, and
wherein a first sub-frame of a measurement gap is determined based on the system frame number (SFN) and the sub-frame, and
wherein the measurement gap is performed on at least one serving cell including the serving cell at the first sub-frame,
wherein the measurement gap starts at an ending point of a sub-frame that ends last among sub-frames that occur immediately before the measurement gap.

20. The base station of claim 19, wherein the controller is further configured to:
apply the measurement gap to a first operating frequency band in case that the measurement gap configuration information indicates a first gap configuration;
apply the measurement gap to a second operating frequency band in case that the measurement gap configuration information indicates a second gap configuration; and
apply the measurement gap to the first and second operating frequency bands in case that the measurement gap configuration information indicates a third gap configuration.

21. The base station of claim 20, wherein the first operating frequency band is associated with a master cell group (MCG), and the second operating frequency band is associated with a secondary cell group (SCG).

22. The base station of claim 21, wherein the serving cell is a primary cell (Pcell) of the MCG or a primary secondary cell (PScell) of the SCG.

23. The first base station of claim 21, wherein the measurement gap configuration information indicating the first gap configuration is determined by the base station which is associated with the MCG and transmitted by the base station to a user equipment (UE), and wherein the measurement gap configuration information indicating the second gap configuration is determined by another base station which is associated with the SCG and transmitted by the base station to the UE.

24. The base station of claim 20, wherein a downlink signal is not transmitted on an operating frequency band of the at least one serving cell during a measurement gap corresponding to the indicated gap configuration.

* * * * *